United States Patent
Tompkins et al.

(10) Patent No.: US 9,749,855 B1
(45) Date of Patent: *Aug. 29, 2017

(54) METHOD AND SYSTEM FOR CONDUCTING FINANCIAL TRANSACTION AND NON-FINANCIAL TRANSACTIONS USING A WIRELESS DEVICE

(71) Applicant: CITICORP CREDIT SERVICES, INC. (USA), Sioux Falls, SD (US)

(72) Inventors: Peter Tompkins, Malibu, CA (US); Jennifer Vos, Glen Head, NY (US); Arun Ahuja, Thousand Oaks, CA (US)

(73) Assignee: Citicorp Credit Services, Inc. (USA), Sioux Falls, SD (US)

( * ) Notice: Subject to any disclaimer, the term of this patent is extended or adjusted under 35 U.S.C. 154(b) by 431 days.

This patent is subject to a terminal disclaimer.

(21) Appl. No.: 14/226,374

(22) Filed: Mar. 26, 2014

Related U.S. Application Data

(60) Division of application No. 11/447,261, filed on Jun. 6, 2006, now Pat. No. 8,725,632, which is a
(Continued)

(51) Int. Cl.
*G06Q 20/32* (2012.01)
*H04W 12/06* (2009.01)
(Continued)

(52) U.S. Cl.
CPC ....... *H04W 12/06* (2013.01); *H04M 1/72525* (2013.01); *H04W 4/003* (2013.01); *H04W 60/00* (2013.01)

(58) Field of Classification Search
CPC ...... G06Q 20/12; G06Q 20/322; G06Q 20/32; G06Q 20/325; G06Q 20/3255;
(Continued)

(56) References Cited

U.S. PATENT DOCUMENTS 4,554,418 A 11/1985 Toy
5,220,501 A 6/1993 Lawlor et al.
(Continued)

FOREIGN PATENT DOCUMENTS

EP 0 745 961 A2 12/1996
EP 745961 A2 12/1996
(Continued)

OTHER PUBLICATIONS

European Search Report for Serial No. 06124645 dated Apr. 5, 2007, pp. 1-9.
(Continued)

*Primary Examiner* — Igor Borissov
(74) *Attorney, Agent, or Firm* — John M. Harrington, Esq.; Johnson, Marcou & Isaacs, LLC

(57) ABSTRACT

The present invention relates to a method for conducting transactions, such as standard banking transactions, using a wireless device, such as a cellular telephone, personal digital assistant, and other web-enabled wireless devices utilizing software downloaded to the wireless device. The software provides a user with interface screens on the display of the wireless device for facilitating information requests to a service provider having access to at least one account of the user.

14 Claims, 16 Drawing Sheets

Related U.S. Application Data continuation-in-part of application No. 10/028,718, filed on Dec. 28, 2001, now Pat. No. 8,346,677, and a continuation-in-part of application No. 09/832,863, filed on Apr. 12, 2001, now Pat. No. 9,418,381, and a continuation-in-part of application No. 09/759,259, filed on Jan. 16, 2001, now abandoned, and a continuation-in-part of application No. 09/775,259, filed on Feb. 1, 2001, now abandoned.

(60) Provisional application No. 60/750,332, filed on Dec. 15, 2005, provisional application No. 60/258,495, filed on Dec. 29, 2000, provisional application No. 60/197,773, filed on Apr. 14, 2000, provisional application No. 60/175,967, filed on Jan. 13, 2000, provisional application No. 60/179,963, filed on Feb. 3, 2000.

(51) Int. Cl.
   *H04M 1/725* (2006.01)
   *H04W 4/00* (2009.01)
   *H04W 60/00* (2009.01)

(58) Field of Classification Search
   CPC .. G06Q 20/3552; G06Q 40/02; G07F 7/1008; H04L 63/08
   USPC ...................................................... 705/39, 35
   See application file for complete search history.

(56) References Cited

U.S. PATENT DOCUMENTS

| | | |
|---|---|---|
| 5,221,838 A | 6/1993 | Gutman et al. |
| 5,465,206 A | 11/1995 | Hilt et al. |
| 5,530,438 A | 6/1996 | Bickham et al. |
| 5,640,002 A | 6/1997 | Ruppert et al. |
| 5,689,565 A | 11/1997 | Spies et al. |
| 5,706,211 A | 1/1998 | Beletic et al. |
| 5,708,422 A | 1/1998 | Greenspan et al. |
| 5,715,020 A | 2/1998 | Kuroiwa et al. |
| 5,742,905 A | 4/1998 | Pepe et al. |
| 5,744,787 A | 4/1998 | Teicher |
| 5,745,689 A | 4/1998 | Yeager et al. |
| 5,748,737 A | 5/1998 | Daggar |
| 5,748,884 A | 5/1998 | Royce et al. |
| 5,754,111 A | 5/1998 | Garcia et al. |
| 5,790,677 A | 8/1998 | Fox et al. |
| 5,790,790 A | 8/1998 | Smith et al. |
| 5,796,832 A | 8/1998 | Kawan |
| 5,839,052 A | 11/1998 | Dean et al. |
| 5,862,325 A | 1/1999 | Reed et al. |
| 5,875,302 A | 2/1999 | Obhan |
| 5,878,141 A | 3/1999 | Grate et al. |
| 5,878,337 A | 3/1999 | Joao et al. |
| 5,878,403 A | 3/1999 | DeFrancesco et al. |
| 5,903,652 A | 5/1999 | Mital |
| 5,907,547 A | 5/1999 | Foladare et al. |
| 5,920,847 A | 7/1999 | Kolling et al. |
| 5,944,786 A | 8/1999 | Quinn |
| 5,953,670 A | 9/1999 | Newson |
| 5,959,543 A | 9/1999 | LaPorta et al. |
| 5,960,069 A | 9/1999 | Felger |
| 5,963,925 A | 10/1999 | Kolling et al. |
| 5,969,543 A | 10/1999 | Erickson et al. |
| 5,987,303 A | 11/1999 | Dutta et al. |
| 5,987,439 A | 11/1999 | Gustin et al. |
| 5,999,624 A | 12/1999 | Hopkins |
| 6,003,019 A | 12/1999 | Eaton et al. |
| 6,014,636 A | 1/2000 | Reeder |
| 6,029,175 A | 2/2000 | Chow et al. |
| 6,035,104 A | 3/2000 | Zahariev |
| 6,044,362 A | 3/2000 | Neely |
| 6,049,698 A | 4/2000 | Capers, Jr. et al. |
| 6,055,505 A | 4/2000 | Elston |
| 6,055,513 A | 4/2000 | Katz et al. |
| 6,064,990 A | 5/2000 | Goldsmith |
| 6,074,820 A | 6/2000 | Van et al. |
| 6,078,820 A | 6/2000 | Wells et al. |
| 6,094,643 A | 7/2000 | Anderson et al. |
| 6,094,681 A | 7/2000 | Shaffer et al. |
| 6,128,603 A | 10/2000 | Dent et al. |
| 6,138,158 A | 10/2000 | Boyle et al. |
| 6,167,253 A | 12/2000 | Farris et al. |
| 6,184,878 B1 | 2/2001 | Alonso et al. |
| 6,230,970 B1 | 5/2001 | Walsh et al. |
| 6,269,393 B1 | 7/2001 | Yost et al. |
| 6,273,334 B1 | 8/2001 | Ijichi et al. |
| 6,289,324 B1 | 9/2001 | Kawan |
| 6,301,567 B1 | 10/2001 | Leong et al. |
| 6,311,058 B1 | 10/2001 | Wecker et al. |
| 6,317,885 B1 | 11/2001 | Fries |
| 6,324,394 B1 | 11/2001 | Vazvan |
| 6,347,307 B1 | 2/2002 | Sandhu et al. |
| 6,356,752 B1 | 3/2002 | Griffith |
| 6,385,652 B1 | 5/2002 | Brown et al. |
| 6,427,132 B1 | 7/2002 | Bowman-Amuah et al. |
| 6,449,638 B1 | 9/2002 | Wecker et al. |
| 6,473,794 B1 | 10/2002 | Guheen et al. |
| 6,477,579 B1 | 11/2002 | Kunkel et al. |
| 6,513,019 B2 | 1/2003 | Lewis et al. |
| 6,535,726 B1 | 3/2003 | Johnson |
| 6,535,855 B1 | 3/2003 | Cahill et al. |
| 6,536,661 B1 | 3/2003 | Takami et al. |
| 6,553,412 B1 | 4/2003 | Kloba et al. |
| 6,609,106 B1 | 8/2003 | Robertson |
| 6,609,113 B1 | 8/2003 | O'Leary et al. |
| 6,633,910 B1 | 10/2003 | Rajan et al. |
| 6,651,219 B1 | 11/2003 | Elliott et al. |
| 6,678,518 B2 | 1/2004 | Eerola |
| 6,694,316 B1 | 2/2004 | Langseth et al. |
| 6,745,229 B1 | 6/2004 | Gobin et al. |
| 6,748,420 B1 | 6/2004 | Quatrano et al. |
| 6,792,411 B1 | 9/2004 | Massey |
| 6,852,645 B2 | 2/2005 | Colombo et al. |
| 6,952,645 B1 | 10/2005 | Jones |
| 6,965,868 B1 | 11/2005 | Bednarek et al. |
| 7,043,230 B1 | 5/2006 | Geddes et al. |
| 7,069,234 B1 | 6/2006 | Cornelius et al. |
| 7,113,801 B2 | 9/2006 | Back et al. |
| 7,181,417 B1 | 2/2007 | Langseth et al. |
| 7,304,753 B1 | 12/2007 | Richter et al. |
| 7,565,643 B1 | 7/2009 | Sweet et al. |
| 7,720,742 B1 | 5/2010 | Mauro et al. |
| 8,112,330 B1 | 2/2012 | Parekh et al. |
| 8,527,337 B1 | 9/2013 | Lim et al. |
| 8,671,212 B2 | 3/2014 | Thomas et al. |
| 2001/0041973 A1 | 11/2001 | Abkowitz et al. |
| 2001/0056387 A1 | 12/2001 | Magary et al. |
| 2001/0056401 A1 | 12/2001 | Tompkins et al. |
| 2002/0035536 A1 | 3/2002 | Gellman et al. |
| 2002/0049788 A1 | 4/2002 | Lipkin et al. |
| 2002/0065752 A1 | 5/2002 | Lewis et al. |
| 2002/0065758 A1 | 5/2002 | Henley et al. |
| 2002/0065774 A1 | 5/2002 | Young et al. |
| 2002/0073236 A1 | 6/2002 | Helgeson et al. |
| 2002/0133462 A1 | 9/2002 | Shteyn et al. |
| 2002/0136214 A1 | 9/2002 | Do et al. |
| 2002/0138389 A1 | 9/2002 | Martone et al. |
| 2003/0009426 A1 | 1/2003 | Ruiz-Sanchez et al. |
| 2003/0046689 A1 | 3/2003 | Gaos et al. |
| 2003/0061132 A1 | 3/2003 | Yu et al. |
| 2003/0195797 A1 | 10/2003 | Klug et al. |
| 2004/0006509 A1 | 1/2004 | Mannik et al. |
| 2004/0006538 A1 | 1/2004 | Steinberg et al. |
| 2004/0039671 A1 | 2/2004 | Smith et al. |
| 2004/0133460 A1 | 7/2004 | Berlin et al. |
| 2004/0158829 A1 | 8/2004 | Beresin et al. |
| 2005/0004978 A1 | 1/2005 | Reed et al. |
| 2005/0027610 A1 | 2/2005 | Wharton |
| 2005/0027612 A1 | 2/2005 | Walker et al. |
| 2005/0176449 A1 | 8/2005 | Cui et al. |
| 2006/0031784 A1 | 2/2006 | Makela et al. |

(56) References Cited

U.S. PATENT DOCUMENTS

| | | | |
|---|---|---|---|
| 2006/0080200 | A1 | 4/2006 | Ashton et al. |
| 2006/0094411 | A1 | 5/2006 | Dupont et al. |
| 2007/0060206 | A1 | 3/2007 | Dam Nielsen et al. |
| 2008/0096535 | A1 | 4/2008 | Kim et al. |
| 2008/0126986 | A1 | 5/2008 | Tsukiji et al. |
| 2008/0307040 | A1 | 12/2008 | So et al. |
| 2010/0332414 | A1 | 12/2010 | Mead et al. |

FOREIGN PATENT DOCUMENTS

| | | | |
|---|---|---|---|
| EP | 1065634 A1 | 1/2001 | |
| EP | 1 146 459 A1 | 10/2001 | |
| EP | 1146459 A1 | 10/2001 | |
| EP | 1168293 A2 | 1/2002 | |
| EP | 1 489 535 A1 | 12/2004 | |
| GB | 2333421 A | 7/1999 | |
| WO | 9722060 A1 | 6/1997 | |
| WO | 9809260 A1 | 3/1998 | |
| WO | 9824040 A1 | 6/1998 | |
| WO | 9839868 A2 | 9/1998 | |
| WO | 9913421 A2 | 3/1999 | |
| WO | WO 99/14711 A2 | 3/1999 | |
| WO | WO 99/14711 A3 | 3/1999 | |
| WO | 9914711 A3 | 6/1999 | |
| WO | 9935595 A2 | 7/1999 | |
| WO | 0033615 A1 | 6/2000 | |
| WO | WO 00/46769 | 8/2000 | |
| WO | WO 00/79818 | 12/2000 | |
| WO | WO 02/33615 A1 | 4/2002 | |
| WO | WO 2004/112275 | 12/2004 | |
| WO | 2005079254 A2 | 9/2005 | |
| WO | WO 2005/079254 | 9/2005 | |

OTHER PUBLICATIONS

"After Singapore, India Gets 'CitiAlert'" [online], [retrieved on Mar. 21, 2001], 1 pg., retrieved from the Internet http://www.banknetindia.com/issues/alert.htm.

CitiAlert [online], [retrieved on Mar. 21, 1001], retrieved from the Internet: http://www.isolv.co.in/products.html, 1 page.

"Citibank Brings CitiAlert to India—Expands Remote Banking Services with India's First Internet and Mobile-Based Money Alert Service," [online], Oct. 18, 2000 [retrieved on Mar. 21, 2001], 2 pages, retrieved from the Internet: http://www.isolv.co.in/citibank.html.

"Citibank Unveils CitiAlert," [online], Economic Times, Mumbai, Oct. 18, 2000, Press Release Oct. 19, 2000 [retrieved on Mar. 21, 2001], 1 page, retrieved from the Internet: http://www.isolv.co.in/etcitialert.html.

"Citibank Rides on Technology with CitiAlert," [online], 1 page, retrieved from the Internet: http://wwwisolv.co.in/fexcitialtert.html.

"You've Got Message . . . from CitiAlert," [online], Press Release, Aug. 19, 2000, India Infoline, Oct. 19, 2000, [retrieved on Mar. 21, 2001], 2 pages, retrieved from the Internet: http://www.isolv.co.in/infolineca.html.

Roselinsky, M., "Ready for Prime Time," Telecommunications, Jun. 1999, pp. 5-8.

Wolfe, D., "The Promise of Unified Messaging," Network, NA, May 1, 1999, pp. 8-13.

Bonner, P., "Cookie Recipes for Web-Page Builders," Windows Sources, Nov. 1997, vol. 4, No. 11, pp. 13-15 and 20-21.

Earls, A., "True Test of the Web—As the Wbe Moves to the Core of Business, Testing of Applications and Infrastructure is More Important Than Ever," Informationweek, 1999, No. 718PGA 1, pp. 21-27.

Neely, M., "What Price Convenience? The ATM Surcharge Debate," [online], The Regional Economist, Jul. 1997, [retrieved on Jan. 3, 2011], 10 pages retrieved from the Internet: http://www.stlouisfed.org/publications/re/artciles/?id+1783.

Office Action in U.S. Appl. No. 11/447,261 dated Oct. 23, 2013, 15 pages.

Office Action in U.S. Appl. No. 11/447,261 dated Apr. 16, 2012, 12 pages.

Office Action in U.S. Appl. No. 11/447,261 dated Jul. 30, 2009, 12 pages.

Office Action in U.S. Appl. No. 11/447,261 dated Jun. 6, 2006, 10 pages.

Final Office Action in U.S. Appl. No. 11/447,261, dated Jul. 10, 2012, 16 pages.

Final Office Action in U.S. Appl. No. 11/447,261, dated Jan. 6, 2010, 11 pages.

Final Office Action in U.S. Appl. No. 11/447,261, dated Apr. 29, 2009, 9 pages.

Office Action for U.S. Appl. No. 09/832,863, Jan. 10, 2011, 24.

Final Office Action for U.S. Appl. No. 09/832,863, Jan. 22, 2007, 36.

Final Office Action for U.S. Appl. No. 09/759,259, Oct. 3, 2007, 17.

Final Office Action for U.S. Appl. No. 10/028,718, Oct. 31, 2007, 6.

Final Office Action for U.S. Appl. No. 09/832,863, Nov. 19, 2012, 27.

Office Action for U.S. Appl. No. 10/028,718, Nov. 29, 2006, 6.

Office Action for U.S. Appl. No. 09/832,863, Dec. 10, 2004, 16.

Final Office Action for U.S. Appl. No. 10/028,718, Dec. 22, 2004, 7.

European Communication for EP Application No. 07105497, Dec. 7, 2008, 7.

Final Office Action for U.S. Appl. No. 09/775,259, Feb. 16, 2005, 10.

Office Action for U.S. Appl. No. 09/759,259, Feb. 8, 2007, 15.

Final Office Action for U.S. Appl. No. 09/759,259, Mar. 11, 2005, 14.

Office Action for U.S. Appl. No. 09/759,259, Apr. 28, 2006, 16.

Final Office Action for U.S. Appl. No. 09/832,863, May 10, 2011, 25.

Office Action for U.S. Appl. No. 10/028,718, May 17, 2007, 6.

Office Action for U.S. Appl. No. 09/759,259, Jun. 11, 2004, 12.

Extended European Search Report and Opinion for European Patent Application No. 05802843.2, Jun. 12, 2012, 5.

International Search Report for Application No. PCT/US01/03202, Jun. 18, 2001.

Office Action for U.S. Appl. No. 09/832,863, Jun. 18, 2012, 29.

Office Action for U.S. Appl. No. 09/832,863, Jun. 26, 2015, 31.

European Search Report for Application No. EP 01 91 2682, Jun. 8, 2004.

Office Action for U.S. Appl. No. 09/775,259, Jun. 9, 2004, 8.

Office Action for U.S. Appl. No. 10/028,718, Jun. 9, 2004, 8.

Office Action for U.S. Appl. No. 09/832,863, Jul. 14, 2010, 30.

Office Action for U.S. Appl. No. 09/832,863, Jul. 3, 2006, 26.

European Communication for EP Patent Application No. 01201396, Jul. 30, 2007, 11.

Final Office Action for U.S. Appl. No. 09/832,863, Jul. 8, 2005, 21.

European Search Report for counterpart European Patent Application No. EP 07105497.7, Aug. 20, 2007, 9.

International Preliminary Report for Application No. PCT/US01/03202, Sep. 24, 2002.

"Boost Value Added Services with SIM Application Toolkit", A White Paper, Temples, Oct. 8, 1998, 19.

"CitiConnect [online]", Retrieved on Nov. 26, 2001 from Internet, http://www.citissb.com/citiConnect/main.htm, 2001, 1.

"CitiConnect Escrow Service, a Web-Enabled Escrow Service from Citibank, [online]", Retrieved from the Internet on Nov. 26, 2001, http://www.citigroup.com/citigroup/net/b2b/ccon.htm, 2001, 5.

"Dispensing with the Cheque: Part 5 Debit Cards, Smart Cards, Clearing & Settlement, Home-Banking", Electronic Payments International, No. 101, Oct. 1995, 1.

"Electronic Commerce [online]", Retrieved from the Internet on Dec. 29, 2000, http://www.3rdfrontier.com/elect.htm, Dec. 29, 2000, 1.

"Mobile Commerce [online]", Retrieved from the Internet on Dec. 29, 2000, http://www.3rdfrontier.com/mobilecomm.htm, 2000, 1.

(56) References Cited

OTHER PUBLICATIONS

"The Java 2 Enterprise Edition Developer's Guide, Version 1.2.1", Sun Microsystems, Internet Citation, retrieved from the Internet URL: http://java.sun.com/j2see/sdk_1.2.1/devguide1_2_1.pdf [retrieved on Nov. 3, 2006], May 1, 2000, 201.

"VISA Acquires Electronic Banking and Bill Payment Operation", PR Newswire, Aug. 3, 1994.

Amato-Mccoy, et al., "Web Bank Plans to Enable TV Access", Bank Systems & Technology, V. 35, No. 1, Jan. 1998, 1.

Gray, "Here Comes Home Banking—Again", Credit Card Management, May 1994, 1.

Hesmer, "Portlet Development Guide, Working with the Portlet API 1.1", Internet Citation, Apr. 2, 2002, XP002267927, retrieved from the Internet: URL: http://w.bis.business.utah.edu/resources/wps_project.htm [retrieved on Jan. 23, 2004, Apr. 2, 2002, 83.

Kennedy, "EDS, France Telecom, US West Form Interactive Transaction Services Partnership", Business Wire s. 1, Nov. 17, 1993, 1.

Muller-Veerse, "Mobile Commerce Report [online]", Retrieved on Apr. 2, 2002, http://www.durlacher.com, Apr. 2, 2002, 76.

Sullivan, "Invasion-of-Privacy Fears Can be Based on Fiction, Not Fact", vol. 14, No. 23, Jun. 9, 1997, 1.

Terveen, et al., "Helping Users Program Their Personal Agents", ACM Press SIGCHI Conference, 1996, 355-361.

Varshney, et al., "Mobile Commerce: A New Frontier [online]", Retrieved from the Internet on Dec. 28, 2000, http://computer.org/computer/articles/October/Varshney.html, Dec. 28, 2000, 11.

METHOD AND SYSTEM FOR CONDUCTING FINANCIAL TRANSACTION AND NON-FINANCIAL TRANSACTIONS USING A WIRELESS DEVICE

CROSS-REFERENCE TO RELATED APPLICATIONS

The present application is a divisional of, and claims priority under 35 U.S.C. §120 to, co-pending U.S. patent application Ser. No. 11/447,261 filed Jun. 6, 2006, entitled "METHOD FOR CONDUCTING FINANCIAL AND NON-FINANCIAL TRANSACTIONS USING A WIRELESS DEVICE," which claims priority under 35 U.S.C. §119(e) from U.S. provisional application Ser. No. 60/750,332, filed Dec. 15, 2005, entitled "METHOD FOR CONDUCTING FINANCIAL AND NON-FINANCIAL TRANSACTIONS USING A WIRELESS DEVICE," the entirety of each of which is incorporated herein by reference.

U.S. patent application Ser. No. 11/447,261, of which the present application is a divisional, is a continuation-in-part of each of the following applications: U.S. patent application Ser. No. 10/028,718, filed Dec. 28, 2001, entitled "METHOD AND SYSTEM FOR CONDUCTING COMMERCE OVER A WIRELESS COMMUNICATION NETWORK" (now U.S. Pat. No. 8,346,677), which claims priority to U.S. Provisional Application No. 60/258,495, filed Dec. 29, 2000, entitled "METHOD AND SYSTEM FOR CONDUCTING COMMERCE OVER A WIRELESS COMMUNICATION NETWORK;" U.S. patent application Ser. No. 09/832,863, filed Apr. 12, 2001, entitled "METHOD AND SYSTEM FOR NOTIFYING CUSTOMERS OF TRANSACTION OPPORTUNITIES," which claims priority to U.S. Provisional Application No. 60/197,773, filed Apr. 14, 2000, entitled "METHOD AND SYSTEM FOR NOTIFYING CUSTOMERS OF TRANSACTION OPPORTUNITIES;" U.S. patent application Ser. No. 09/759,259, filed Jan. 16, 2001, entitled "METHOD AND SYSTEM FOR ACCESSING FINANCIAL INFORMATION USING WIRELESS DEVICES" (now abandoned), which claims priority to U.S. Provisional Application No. 60/175,967, filed Jan. 13, 2000, entitled "METHOD AND SYSTEM FOR ACCESSING FINANCIAL INFORMATION USING WIRELESS DEVICES;" and, U.S. patent application Ser. No. 09/775,259, filed Feb. 1, 2001, entitled "INTEGRATED SYSTEM FOR PROVIDING FINANCIAL SERVICES INCLUDING INTERNET TV CAPABILITIES" (now abandoned), which claims priority to U.S. Provisional Application No. 60/179,963, filed Feb. 3, 2000, entitled "INTEGRATED SYSTEM FOR PROVIDING FINANCIAL SERVICES INCLUDING INTERNET TV CAPABILITIES," the entirety of each of which is incorporated herein by reference.

BACKGROUND OF THE INVENTION

Field of the Invention

The present invention relates generally to a method and system for accessing financial information and/or conducting financial and non-financial transactions using a wireless device. More particularly, the invention relates to a method and system for providing software to a user's wireless device, said software facilitating transactions between the user and a service provider, e.g., financial institution holding at least one user account.

Description of Related Art

While banking transactions have traditionally been conducted in-person or over the phone, in recent years banking customers have become accustomed to the use of Automated Teller Machines ("ATMs") and online banking applications. The simple and clear menu of choices that ATMs and online applications offer, allow a user to easily step through a financial transaction from a remote location.

In addition to an increase in remote banking transactions, the use of wireless devices has also become more popular. While at one time, mobile phone service was the exclusive function of a wireless device; the capability of these devices continues to expand. In fact, today wireless devices allow for the use of "browser" or WAP-based applications. However, while these applications provide some practical function, generally they do not offer a user-friendly interface, and therefore they are limited in use.

Ideally, financial transactions would conducted with the ease and clarity offered by the use of ATMs and online applications coupled with the convenience of using a user's own wireless device. Since there remains a need for a method of conducting various financial and non-financial transactions via a wireless device using a user-friendly interface, the present invention is directed to meeting that need. The present invention provides a method of accessing information and conducting financial and non-financial transactions using a wireless device.

BRIEF SUMMARY OF THE INVENTION

It is an object of the present invention to provide an efficient and convenient method for accessing critical information using a wireless device.

It is another object of the present invention to provide an efficient and convenient method for conducting financial and/or non-financial transactions using a wireless device.

It is another object of the present invention to provide an efficient and convenient method for addressing account inquiries and other customer service related needs using a wireless device.

It is a further object of the present invention to facilitate the completion of standard banking transactions using a wireless device.

Specifically, it is an object of the present invention to allow a user, via a wireless device, to sign-on to a user application interface with a service provider holding user account information, complete an authentication process, and view information such as account balances, and account activity details. Further, a user may make transfers between linked accounts as well as view past and future scheduled transfers, make bill payments, and get assistance in locating a branch or ATM. It is also an object of the present invention to provide multi-lingual support for all transactions and services.

It is another object of the present invention to provide clear user prompts that allow the user to step through the completion of a desired transaction with a service provider via a wireless device.

These objects, among others, have been achieved by means of the present invention which facilitate registering a user with the service, wherein registering with the service can be done by authenticating the user to the service provider through any existing communication channels such as in-person, telephone, or online. Further, the service set-up includes providing the service provider with the phone number corresponding to the user's wireless device from which the service may be accessed. Once the account has been created, software is downloaded from the service provider to the user's wireless device. In a particular embodiment, the user's wireless device is java-enabled and has sufficient size and memory to support the software application. Accessing the software application through the wireless device prompts the user with a series of user-friendly menus that enable the user to communicate with the service provider and conduct any number of financial and non-financial transactions using the wireless device. When the service provider is accessed by using the software application, and the user is authenticated to the system, account information may be pushed from the service provider's server to the user's wireless device via a sequence of communication protocols, such as OFX (Open Financial Exchange) messages.

It is therefore an object of the present invention to provide a method and a system that integrates a user wireless device with a service provider via various communication protocols enabling wireless access to user account information.

BRIEF DESCRIPTION OF THE DRAWINGS

The following Figures exemplify embodiments of the present invention in conjunction with the Detailed Description set forth herein.

DETAILED DESCRIPTION OF THE PREFERRED EMBODIMENTS

Other features of the present invention may become apparent in the course of the following description of exemplary embodiments which are given for illustration and are not intended to be limiting.

Figure 1:
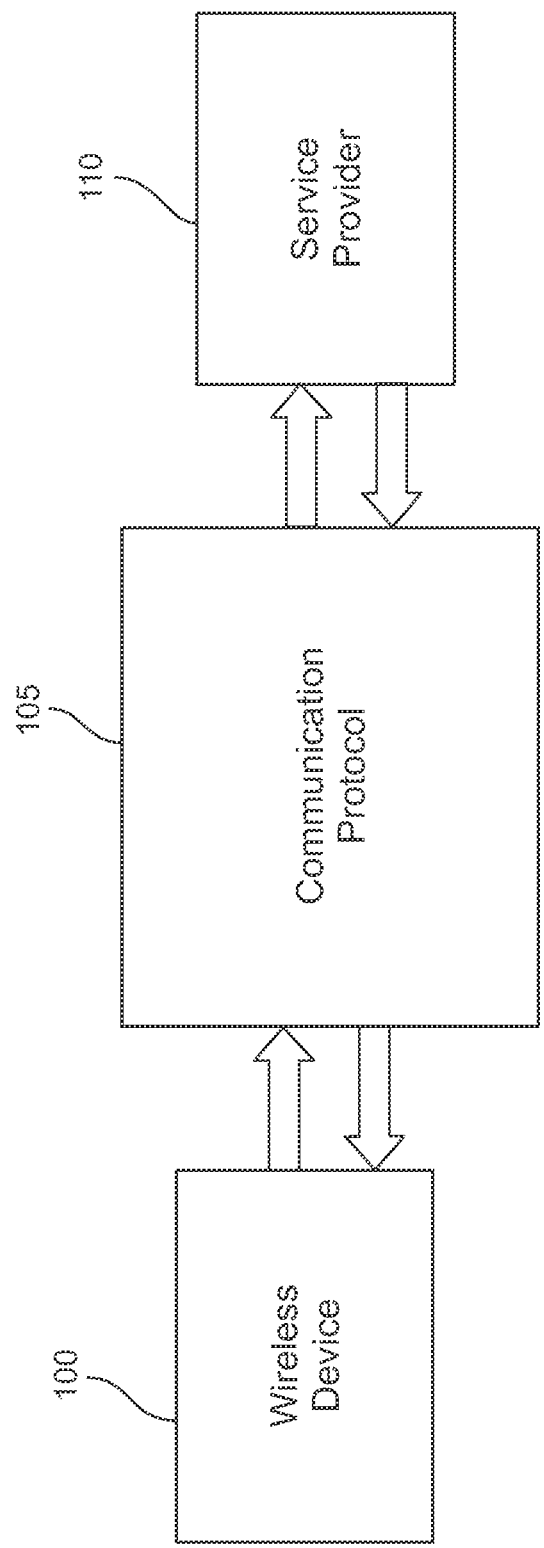
FIG. 1—presents a block diagram illustrating the communication process between the components of a wireless communication system according to an embodiment of the present invention.

FIG. 1 provides a block diagram depicting a system overview of the present invention. The system includes a wireless device (100) for transmitting/receiving information to/from a service provider (110) via a communication protocol (105). As described in detail below, a user operating a wireless device (100) may communicate with a service provider (110) in order to ascertain user account and other information therefrom if the user has registered for the information service application (hereafter "ISA") with the service provider holding a user account(s).

In a preferred embodiment, the user's wireless device (100) should have sufficient memory and functional capability to accommodate the client ISA requirements, including user-interface application and supported operating software, as well as any other peripheral applications required for using the ISA. The user's wireless device (100) may also be required to support certain security standards, e.g., 128-bit SSL or equivalent. Wireless devices which may be used with the present invention include, but are not limited to, cellular phones, personal digital assistants ("PDAs") such as Blackberry devices, Treos, and the like, which meet the memory and functional capability requirements for running the client ISA. In general, a suitable wireless device includes a circuit board, antenna, display, keyboard, microphone, speaker, and battery. Included on the circuit board are analog-to-digital and digital-to-analog conversion chips, read-only memory and flash memory chips, a digital signal processor, and a microprocessor. Additionally, the wireless device will include a radio frequency (RF) and power section, and RF amplifiers that handle signals traveling to and from the antenna. The wireless device (100) transmits and receives communications from the service provider (110) through the network supporting the wireless device using TCP/IP SSL (Transmission Control Protocol/Internet Protocol Secure Sockets Layer) communication protocols.

The service provider (110) may be any host which establishes and manages user financial accounts, including, but not limited to, financial institutions such as banks, credit card companies, brokerage entities and the like. Additionally, included in the definition of "service provider" as used herein, are other entities acting for the host to implement portions of the process. The service provider (110) may use a data server(s) or other data storage means to store account data. In an exemplary embodiment, the data server(s) used should have the capacity to support hundreds of concurrent sessions, where any single transaction request is processed quickly, e.g., in less than 2 seconds.

Figure 2:
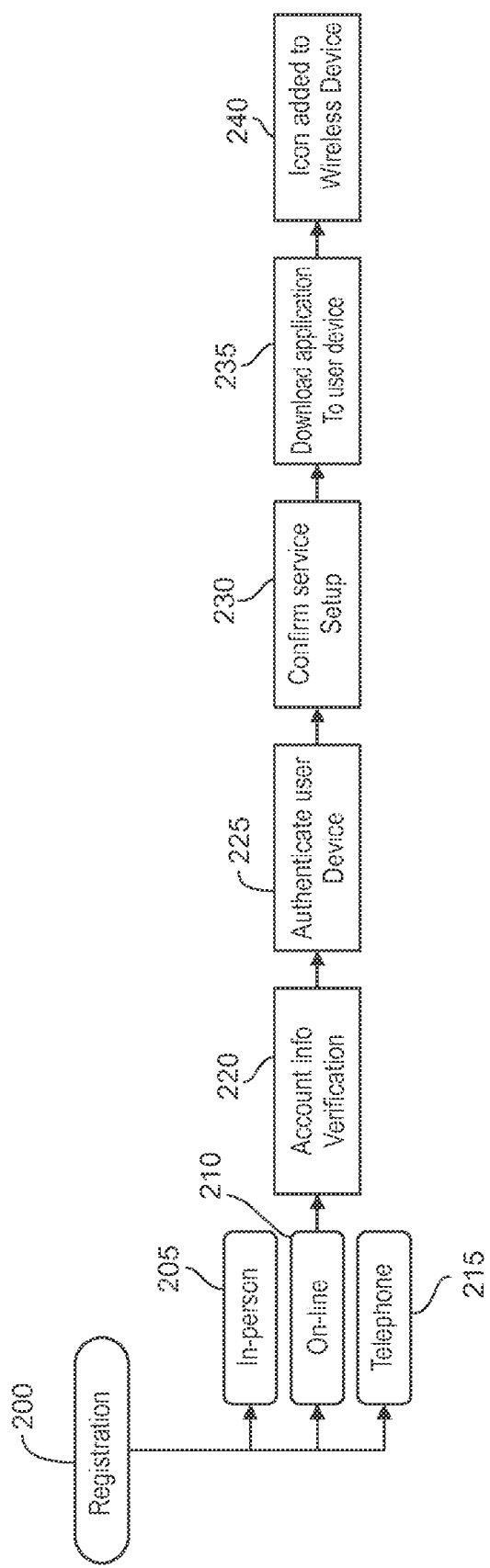
FIG. 2—presents an exemplary embodiment of the process for registering a user with the service.

FIG. 2 provides a block diagram depicting an exemplary method of registering for the ISA of the present invention (200). Registration is the process in which a user requests the ISA be downloaded and installed on the user's wireless device. As described in detail below, the ISA provides the user with a user-friendly means of communicating information to the service provider.

The user may choose to register for the ISA from the service provider or an affiliate thereof through any available established means, such as in-person (205), on-line (210), or over the telephone (215). In a preferred embodiment, during the registration process, the user identifies and authenticates with appropriate identification, the account or set of accounts, e.g., checking, savings, brokerage, credit card, etc., or customer identification number ("CIN") to be set-up and this information is verified by the service provider (220). The user also identifies the carrier, e.g., Cingular, T-Mobile, Verizon, etc. and supported wireless device to be used, and provides a 10 digit mobile number corresponding to the selected wireless device, which information is verified by the service provider (225). Once the verification of account and device information has been completed, the customer receives an initiation short message service ("SMS") message to the user's wireless device requiring the user to confirm service set-up and initiate installation of the client ISA on the wireless device by entering the user's phone number (230). The entered phone number is checked against the phone number to which the SMS message was sent. Alternatively, the wireless service provider may provide the phone number automatically, thus further securing the transaction. The installation process requires the user to initiate the client ISA download process through a designated uniform resource locator ("URL") and may require the user to agree to certain terms and conditions of use (235). The ability to initiate the download from the URL provided in the initiation SMS message is available for a limited amount of time, e.g., 24 hours.

In a preferred embodiment of the present invention, once the URL is accessed, the initial download and installation of the ISA takes less than 2 minutes depending on the service carrier of the wireless device and the carrier's wireless network and connections.

In an alternative embodiment of the present invention, the client ISA is pre-loaded on the user's wireless device at the time the user purchases the wireless device. If the application is pre-loaded to the user's device, the customer would still be required to enroll in the service with the service provider by registering the 10-digit mobile number and associating the wireless device with a specific CIN corresponding to a user account(s) held by the service provider.

Once the client ISA has been downloaded to the user's wireless device, an ISA icon is added to the desktop of the user wireless device (240). Accessing the icon allows the user to initiate a session with the service provider. Only CINs that are registered to a wireless device through an enrollment process may be accessed via that specific wireless device. Also, more than one CIN may be associated with a particular wireless device and a single CIN may be associated with more than one wireless device.

Figure 3:
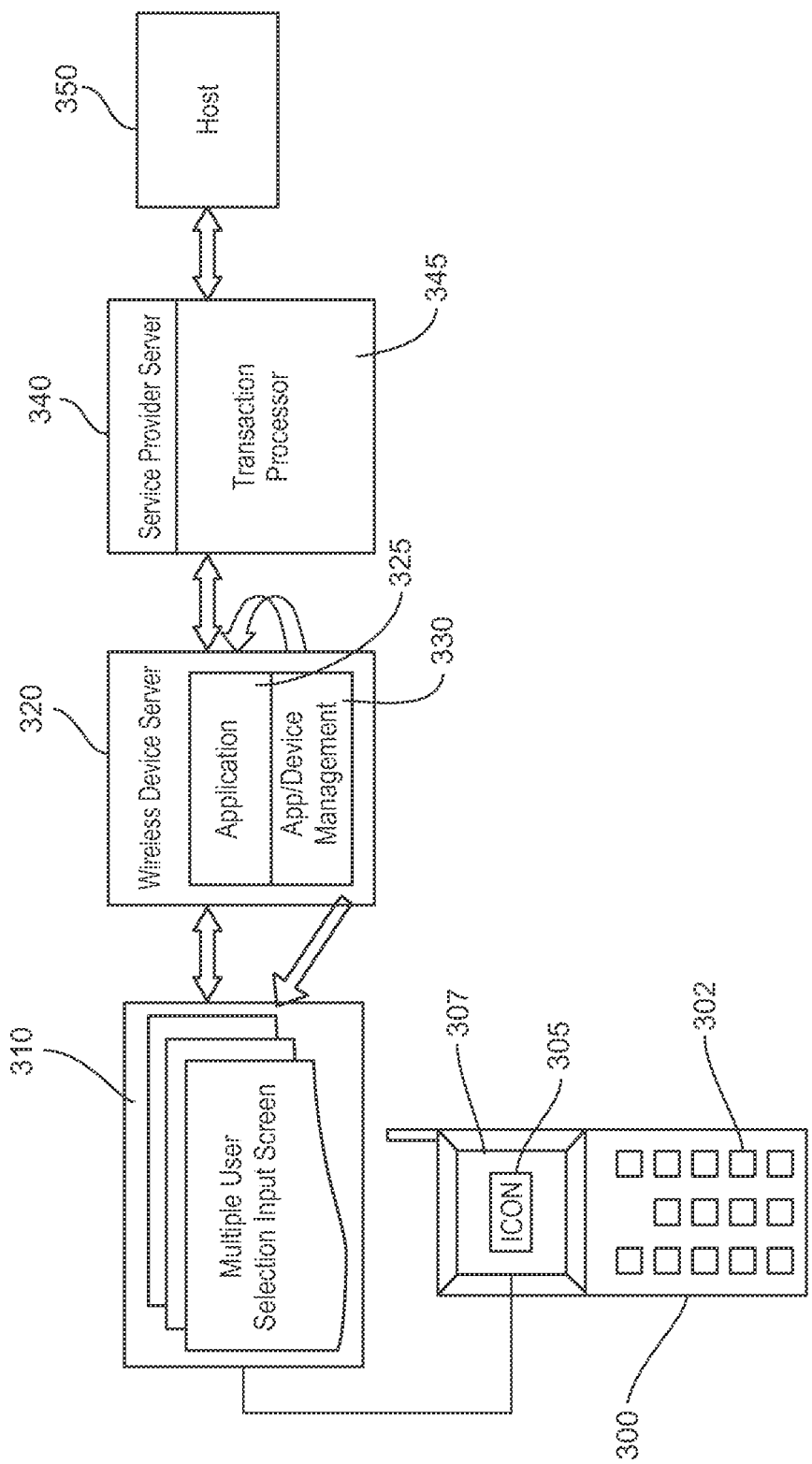
FIG. 3—presents an exemplary embodiment of the flow of information between the user's wireless device and the service provider.

FIG. 3 illustrates the communication between the enrolled user via the wireless device (300) and the service provider (350) according to a preferred embodiment of the present invention. The client ISA is downloaded in two parts from the wireless device server (320). The first part of the client ISA is a Java application, similar to a browser, which, when run, initiates communication with the wireless device server (320). The wireless device server (320) detects the Java application is being run for the first time and next downloads the second part of the client ISA, the application code, which is interpreted by the Java application. Once the client ISA has been downloaded and installed on the user's wireless device (300), an application, i.e., ISA, icon (305) is placed on the display, i.e., desktop, of the wireless device (300). Interaction with the client ISA is achieved via Java-based menu screens, (310) which are visible on the display (307) of the wireless device (300). The user interface screens (310) vary based on the user supplied input corresponding to the transaction the user desires to complete. The user enters transaction instructions via the keypad (302) associated with the wireless device (300) or any other available means for a user to input and communicate with the user device, e.g., touch screen with stylus. Using the ISA icon, the client ISA runs locally on the wireless device (300) until such time as information is needed from the service provider (350), such as map information or account information. When information is required from the service provider 350, the user is prompted by the client ISA for any required identifying information (i.e. CIN and PIN) and a message is sent to the wireless device server 320.

Using application 325 and application/device manager 330, the wireless device server (320) manages requests to the service provider from the user via the user's wireless device and deciphers, decodes and formats the requests for transmission to the service provider server (340). The transaction is processed by a transaction processor (345) at the service provider server (340) and the appropriate information is requested from the host (350) using, for example, the OFX protocol. In an alternative embodiment, the service provider server and the host are the same server(s). The requested information is transmitted through the wireless communication channels back to the display (307) of the user's wireless device (300). The information is presented in the form of a user interface application screen (310) that provides the user clear options for facilitating completion of the desired transactions. Accordingly, the system and method described herein minimize the number of transmissions, and consequently connections, to and from the wireless device and service provider since the requests requiring information from the service providers, i.e., host, are collected and managed at the wireless device, allowing continued use of the client ISA on the wireless device, thus providing faster service due to reduced network dependence.

As described below, the wireless device server (320) offers the flexibility to be able to recognize and translate various request protocols from the client ISA and a variety of service providers. Wireless device server (320) translates these protocols allowing one application on the wireless device to act on data from a number of disparate host systems, including the host service provider and others, e.g., Microsoft Mappoint.

Figure 4A:
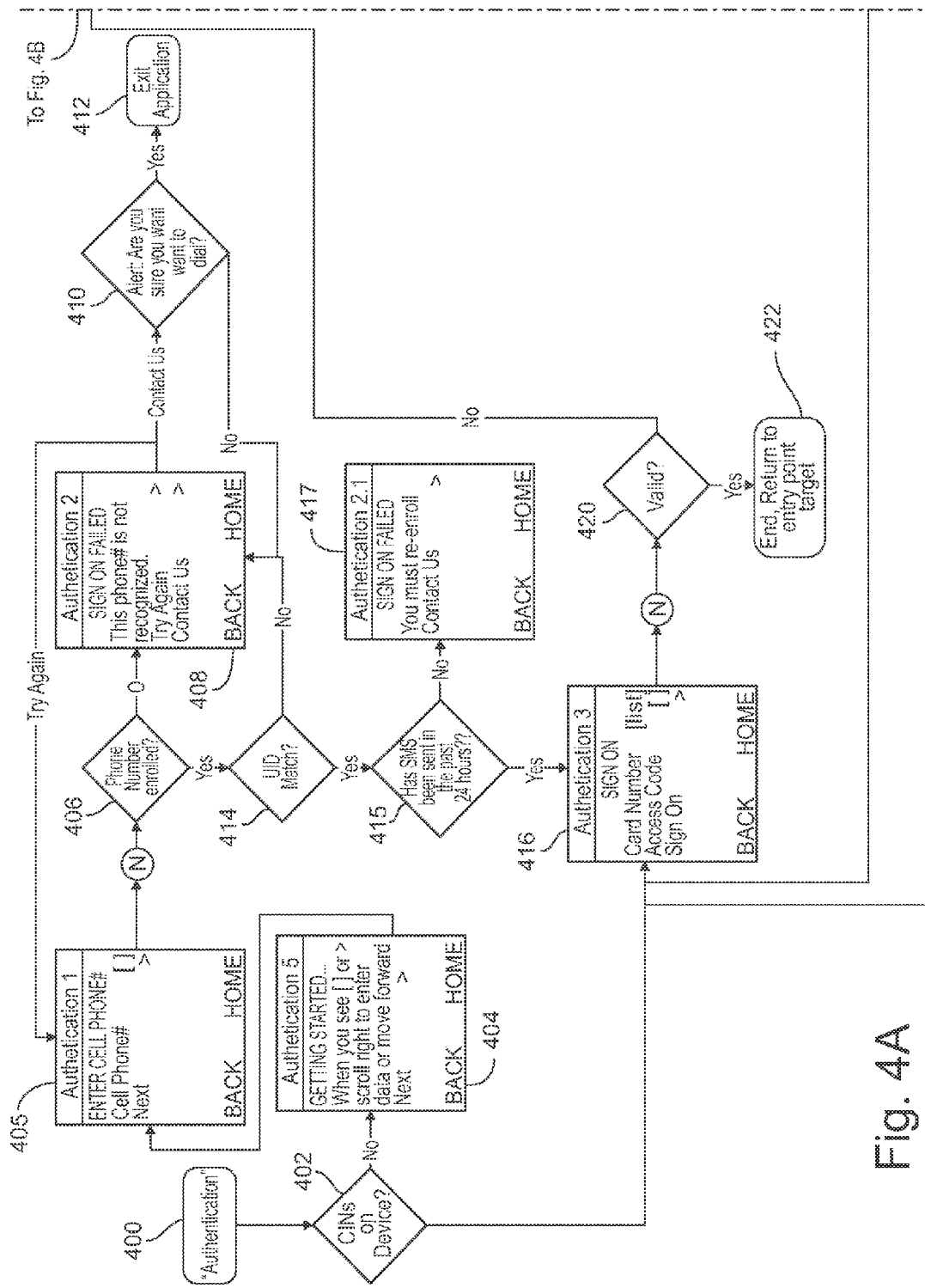
FIGS. 4A and 4B present an exemplary embodiment of the process of authenticating a user account from wireless device and illustrates the visible display on the screen of a user's wireless device according to the exemplary embodiment.
Figure 4B:
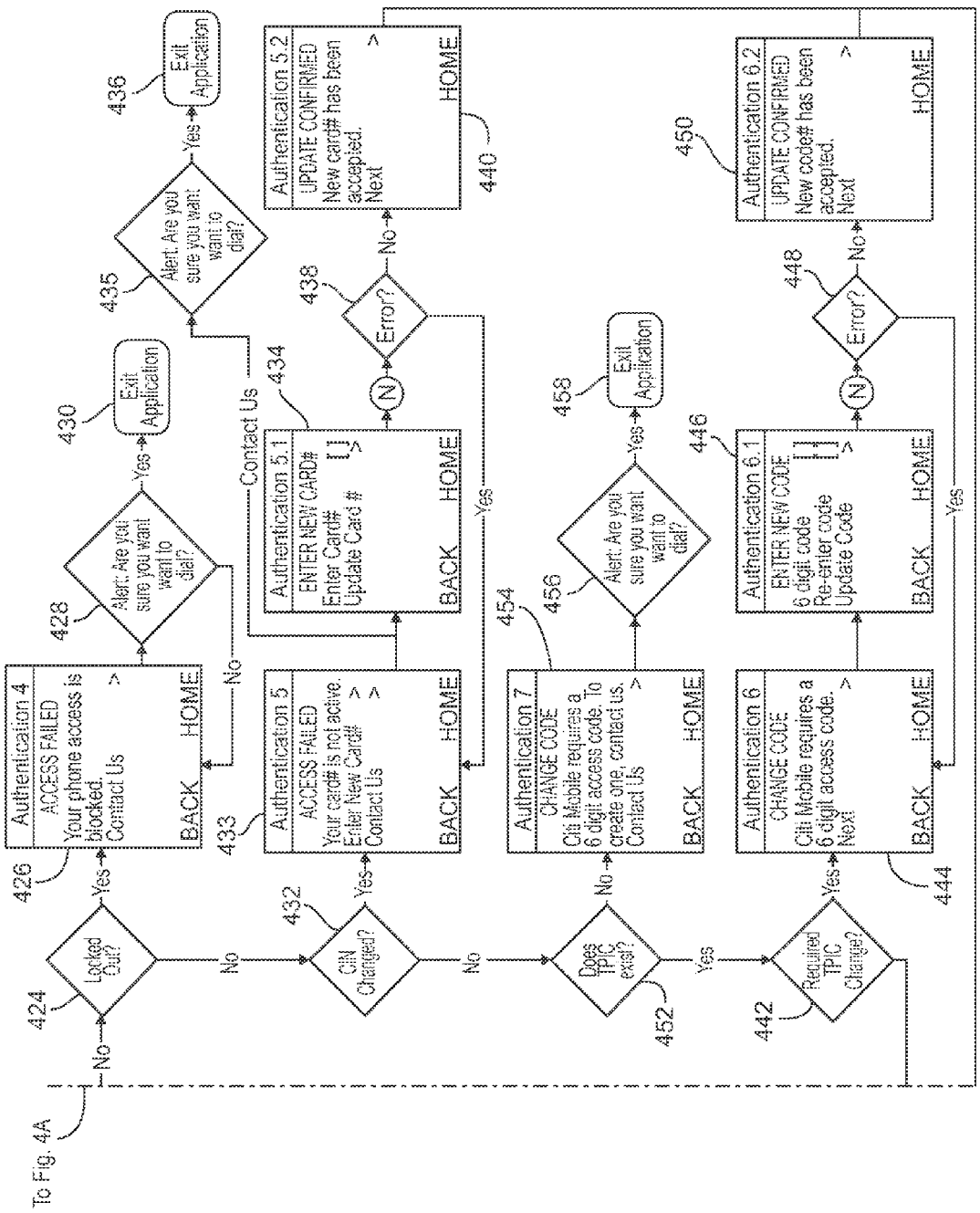

FIGS. 4A and 4B illustrate a preferred embodiment for authenticating a user to the service provider during the registration process, as well as, authenticating the user prior to accessing account information once service has been established to the user's wireless device. Importantly, prior to authentication and registration within the service, a user is enrolled for the service via a separate channel, such as the online banking channel (e.g., Citibank Online) or through a customer service representative as described with respect to FIG. 2. For example, on Citibank Online, the user must enter a user name and password prior to being permitted to enroll for the service. Similarly, if a user calls customer service, they are identified using arbitrary questions, that have become industry norms, and are not likely to be known to an imposter (e.g. mother's maiden name; name of first elementary school; name of pet; etc.). Once identification is verified, the on-line system (or the representative) collects the information required to complete the enrollment for the service, including the phone number to be registered, the cellular carrier, the desired language, etc. As described below, this enrollment process causes an SMS message to be sent to the phone. The security key to this enrollment process is that the ISA uses this SMS message along with a timely (e.g., <24 hours) response from the user on the actual enrolled device as a key to create a unique identifier, e.g., User Identification Number ("UID") that the device carries with it on all future transmissions to the server. This validation and, then, the tagging of the device with this UID allows the physical device (with its unique and verified UID) to become a "second factor" in the authentication of a user (the first factor being the PIN or password), much like an ATM card, in compliance with recent mandates of the Federal Financial Institutions Examination Council (FFIEC).

For certain client ISA features, authentication may not be required for access. Referring to FIGS. 4A and 4B, when a user attempts to access the ISA for the first time, e.g., by clicking on the ISA logo on the user's wireless device, or the user attempts to access restricted-access features offered by the ISA, the client ISA initiates the requisite authentication process (400). When the user clicks on the ISA icon, the ISA checks the device for a registered CIN (402). If no registered CIN is found, the user is prompted by a series of screens in order to guide the user through the registration process (404). At screen (405), the user is prompted to enter the user's cell phone number. The ISA verifies whether or not the entered cell phone number is enrolled and eligible for access to the ISA (406). If the entered cell phone number is not enrolled, the ISA presents the user with a user-interface screen confirming that the wireless device is currently not recognized and providing the user with an option to call customer service to set up service to the wireless device (408). If the user chooses to contact customer service, an alert may confirm that the user is about to dial customer service (410). And if the user confirms the call, the user interface application (412) may be closed and the session terminated.

In the exemplary embodiment of FIGS. 4A and 4B, the service provider, i.e., host, utilizes a third party server to format and relay messages between the service provider and the wireless device. Since the third party server does not retain the user's account data, the third party server instead contains a list of User Identification Numbers ("UIDs") which correspond to users via the user's wireless device number and/or CINs. Accordingly, in this embodiment, if the ISA is successful in locating the entered phone number for the wireless device at (406), the ISA next checks the third party server for an UID match to the wireless device number (414). If there is no UID match found, the user may be presented with a user interface screen confirming that the wireless device is currently not recognized and providing the user with the option to call customer service to set up service to the wireless device (408). If the ISA finds a match for the entered phone number and the UID, the ISA determines if the enrollment verification SMS was sent to the user in the last 24 hours (415). If the enrollment verification SMS was not sent, the user sees a screen indicating that enrollment failed and the user must re-enroll (417). Alternatively, if there is no third party server managing the messages, the ISA checks directly with the service provider to determine enrollment status of the user or CIN(s) associated with the wireless device number.

If the ISA determines that the enrollment verification SMS was sent within the last 24 hours (or other pre-set time limit), the ISA returns a list of CINs registered to the wireless device and prompts the user to provide user authentication information. If more than one CIN is enabled on a particular wireless device, a user interface screen (416) prompts the user to select from a list of CINs and enter the password or other access code (hereafter "access code") associated with the selected CIN. When setting or authenticating access code, alpha keys on devices with QWERTY keyboards will be converted to numbers using a predetermined methodology. The access code is masked when the user is entering it into the wireless device by replacing the actual characters with neutral characters, such as "*". Similarly, any user-specific identification numbers, e.g., CINs or individual account numbers, are never fully displayed on the wireless device, but instead are either masked entirely or partially.

Further to this embodiment, the ISA attempts to validate the user authentication information (420). If the information is successfully verified, the user is permitted to continue with the process of accessing the requested information (422). In a preferred embodiment, when signing on and initiating a session with the service provider, the system may minimize the need for requiring the user to re-input user authentication information unless a standard timeout has been exceeded or the session must be re-established due to some other unavoidable situation. The length of time-outs may be a variable that can be changed as security policy dictates in order to maintain a high level of protection for user data.

If the user authentication information can not be validated, the ISA may lock the user out depending on the information already in the ISA that is connected to the user, preventing the user from accessing and transferring account information from the service provider to the user wireless device (424). If the user is denied access to the account information, the user may be presented with a user interface screen (426) that gives the user the option of calling customer service to assist with authorizing user account. If the user chooses to contact customer service, an alert may confirm that the user is about to dial customer service (428). If the user confirms the call, the user interface application is closed and the session terminated (430). If the user chooses not to contact customer service to access the account, the user may be returned to the screen alerting the user that the application has been locked (426).

Alternatively, if the user has not been locked out of the system, the user is asked if the CIN has changed (432). If the user CIN has changed, the user is shown an access failure screen (433) and is either prompted by a user interface screen (434) to input a new CIN or given the option to contact the service provider (435) and exit the ISA (436). If the user enters a new CIN, the system attempts to verify the new CIN (438). Further, if the new CIN is verified, the user interface displays a screen (440) confirming acceptance of new the CIN. The user is next returned to the "Sign In" screen (416). If the new CIN is not verified, the user may be returned to the screen providing the access failure screen (433).

If the CIN has not been changed, the ISA internally queries the existence of a TPIC (452). If no TPIC exists, the user is shown a screen indicating the need for a TPIC (454) and is directed to contact the service provider (456) and exit the ISA (458). Alternatively, even if a TPIC does exist there may be a need to change the TPIC (442). If a change to the TPIC is required, the user is prompted with a user interface screen (444) that allows the user to input the old TPIC as well as to enter and confirm the new TPIC (446). The ISA verifies that the new TPIC is in the correct format (448) and, if verified, provides an update confirmation screen (450) confirming the change in TPIC and then the "Sign In" screen (416). If the TPIC is not verified, the user is returned to the screen providing the option to change TPIC (444).

Figure 5:
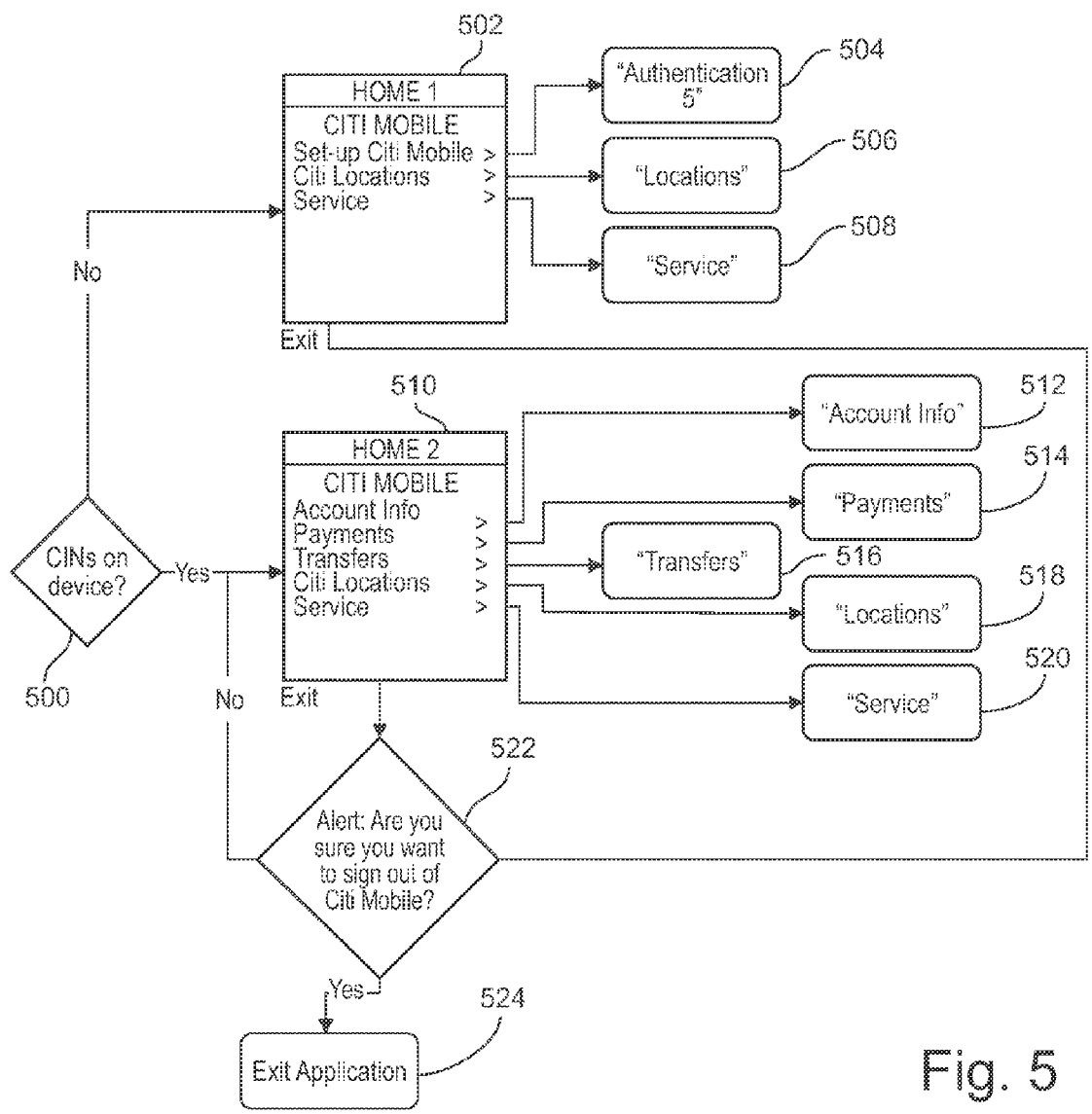
FIG. 5—presents an exemplary embodiment of the "Home" screen visible to a user once they initiate the interface application to communicate with the service provider.

FIG. 5 is an embodiment of the "Home" user interface screen visible on the user's wireless device. If the user attempts to access the features of the ISA and the ISA does not find any CINs on the user's device and thus cannot authenticate the user (500), the user is directed to a user interface screen (502) providing various options that do not require the user to be authenticated to the service provider. For example, the ISA provides the user with the option to set-up an accessible account (504), find branch locations (506), and contact Customer service (508). If the user chooses to exit the application, the user may be alerted to confirm that they are exiting the ISA (522). If the user confirms, the application may be terminated (524).

Alternatively, if the user's CIN is authenticated to the service provider (500), the user is directed to a user interface screen (510) that provides the user with options to access secured account information such as banking features. For example, the present invention may be used to provide banking options that include "Account Information" (512), "Payments" (514), "Transfers" (516), "Locations" (518), and "Service" (520). The user may choose one of the available options and be directed through additional menu choices until the desired transaction is complete or the user chooses to exit the application. Should the user choose to exit the application, the user confirms that they are exiting the user interface application (522) and the application is terminated upon confirmation (524).

Figure 6A:
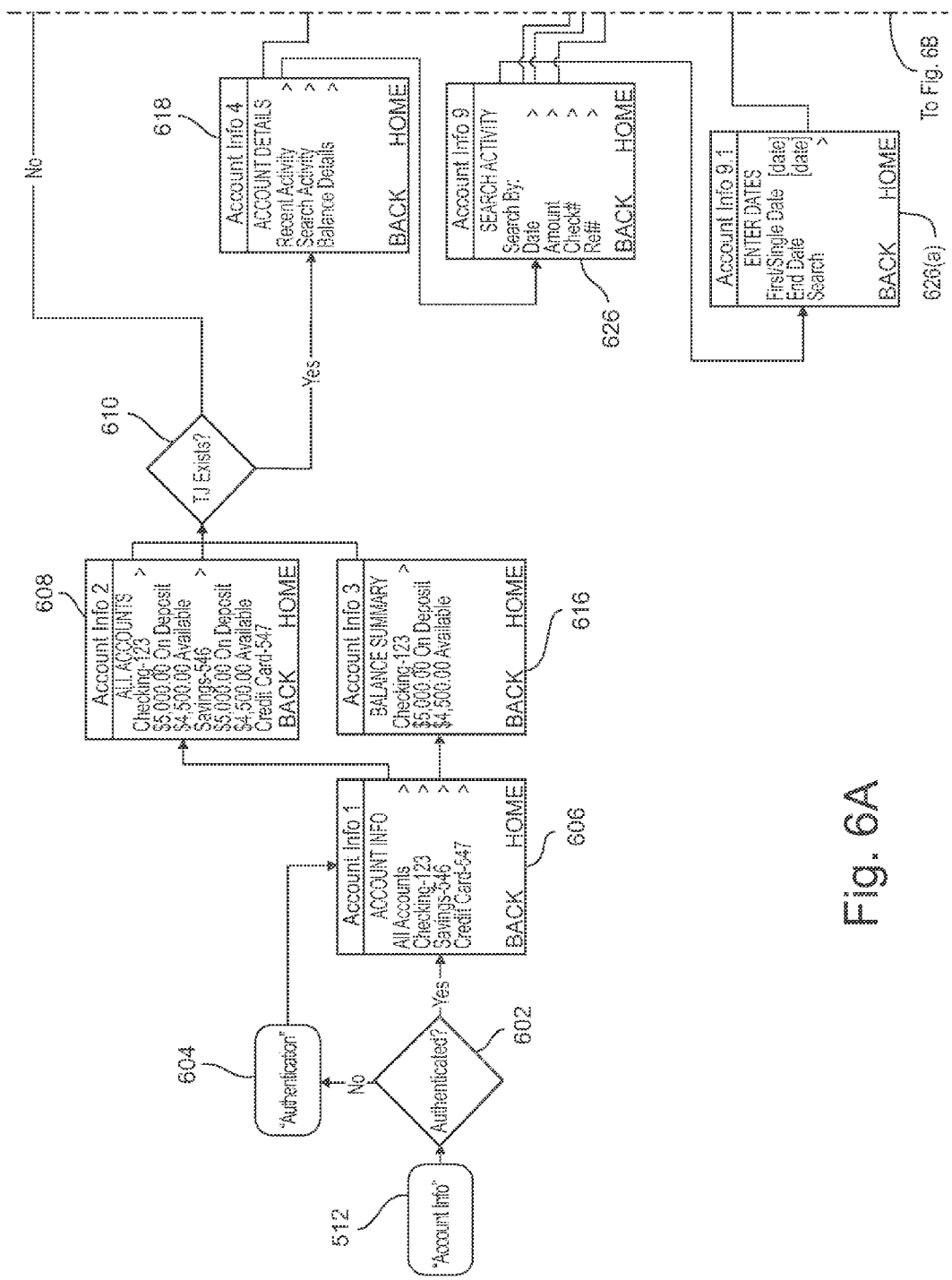
FIGS. 6A and 6B present an exemplary embodiment of the process of accessing the user "Account Information" and illustrates the visible display on the screens of a user's wireless device that facilitate completion of the transaction according to the exemplary embodiment.
Figure 6B:
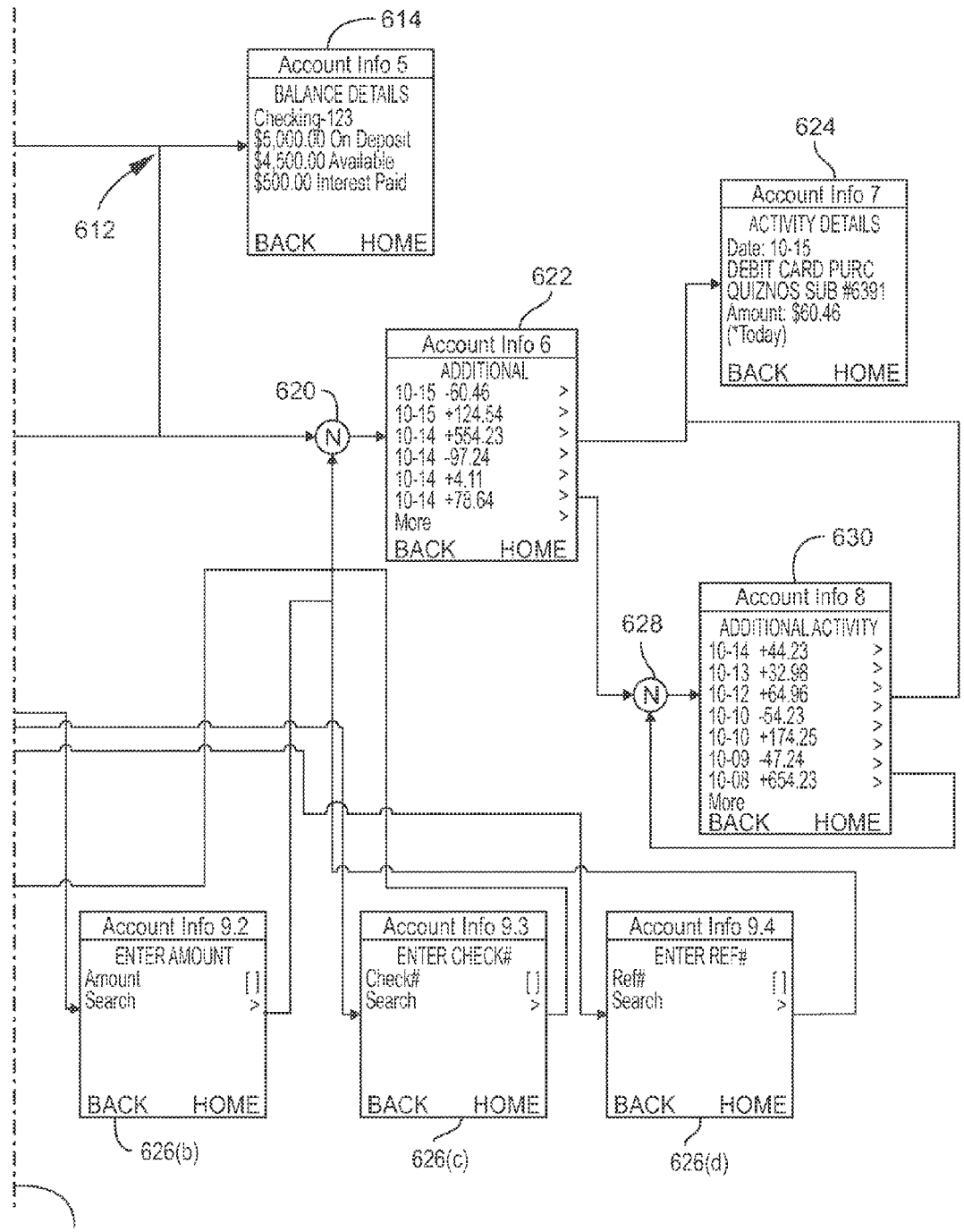

FIGS. 6A and 6B illustrate an instance where the user has selected the option to view "Account Info" (512) from the "Home" screen (see FIG. 5). Since the access to account information is secured, before displaying account information to the user's wireless device, the system ensures that the account has been properly authenticated (602). If the account has not been authenticated, the user may be directed to the user interface screens that step the user through the account authentication process beginning at 604 and illustrated in FIGS. 4A and 4B.

Once the account has been authenticated, a user interface screen (606) is displayed to the user, listing the accounts associated with the authenticated CIN and TPIC. The user may select to view "All Accounts" (608) or a single account (616) from the selection menu. If the user chooses the "All Accounts" option, a listing of each account and the summary information is displayed to the user. If the user chooses only to view a single account, only information concerning that particular account will be displayed.

For each of the accounts, additional details about individual accounts may be available in a transaction journal ("TJ") 610. If additional account details are available for a selected account, the user is directed to a user interface screen (618) that allows the user to view account details such as recent activity, search activity, and balance detail. For example, from the menu (618), the user may choose to view "Recent Activity." The user may be directed to a user interface screen (622) illustrating the date as well as the transaction that was recorded on that date for X number of most recent transactions pulled by the ISA (620), e.g., where X=32, the 32 most recent transactions are retrieved from the service provider and viewable by the user. The user may either choose to see additional details about a particular transaction (624) or choose to continue viewing the next X transactions pulled by the ISA (628) for the selected account (630) from which list the user can again view more specific detail (624).

Alternatively, from the menu screen (618), the user may choose to search for a specific account transaction. If the user selects this option, the user is provided a user interface screen (626) with search fields allowing the user to search for a list of transactions on the account. For example, the user may search by date (626(*a*)), by amount (626(*b*)), by check number (626(*c*)) and by reference number (626(*d*)).

Finally, from menu (618), the user may choose to view balance details at menu (614). Menu (614) is also provided for accounts having not a TJ. The balance details are tailored to the account type—for example a checking account might show current balance, available balance, and available overdraft credit. Similarly, a credit account will show all that information and, in addition, show last payment date and amount, payment due date minimum amount due, total amount owed as of last statement, etc.

Figure 7A:
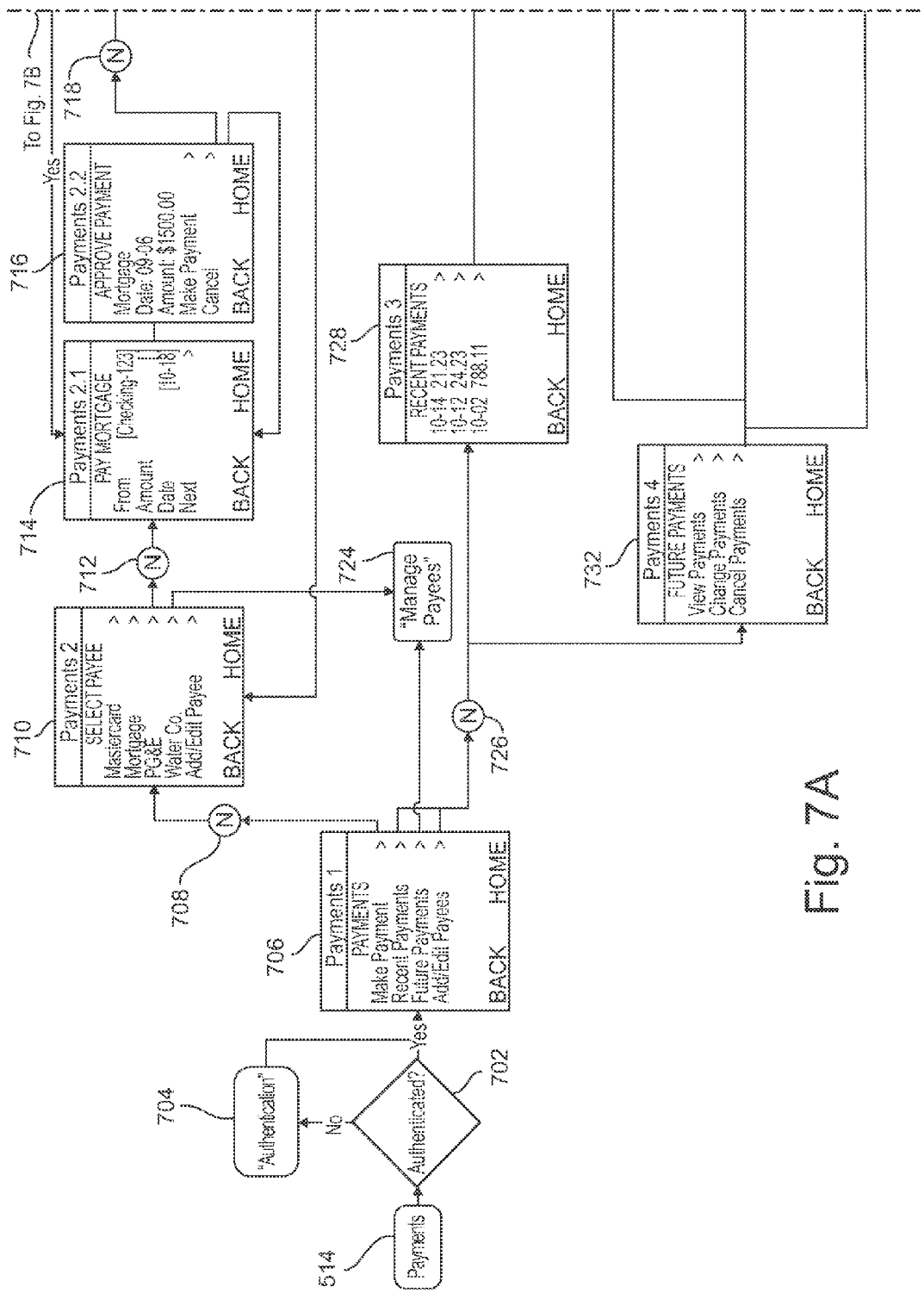
FIGS. 7A and 7B present an exemplary embodiment of the process of making "Payments" and illustrates the visible display on the screens of a user's wireless device that facilitate completion of the transaction according to the exemplary embodiment.
Figure 7B:
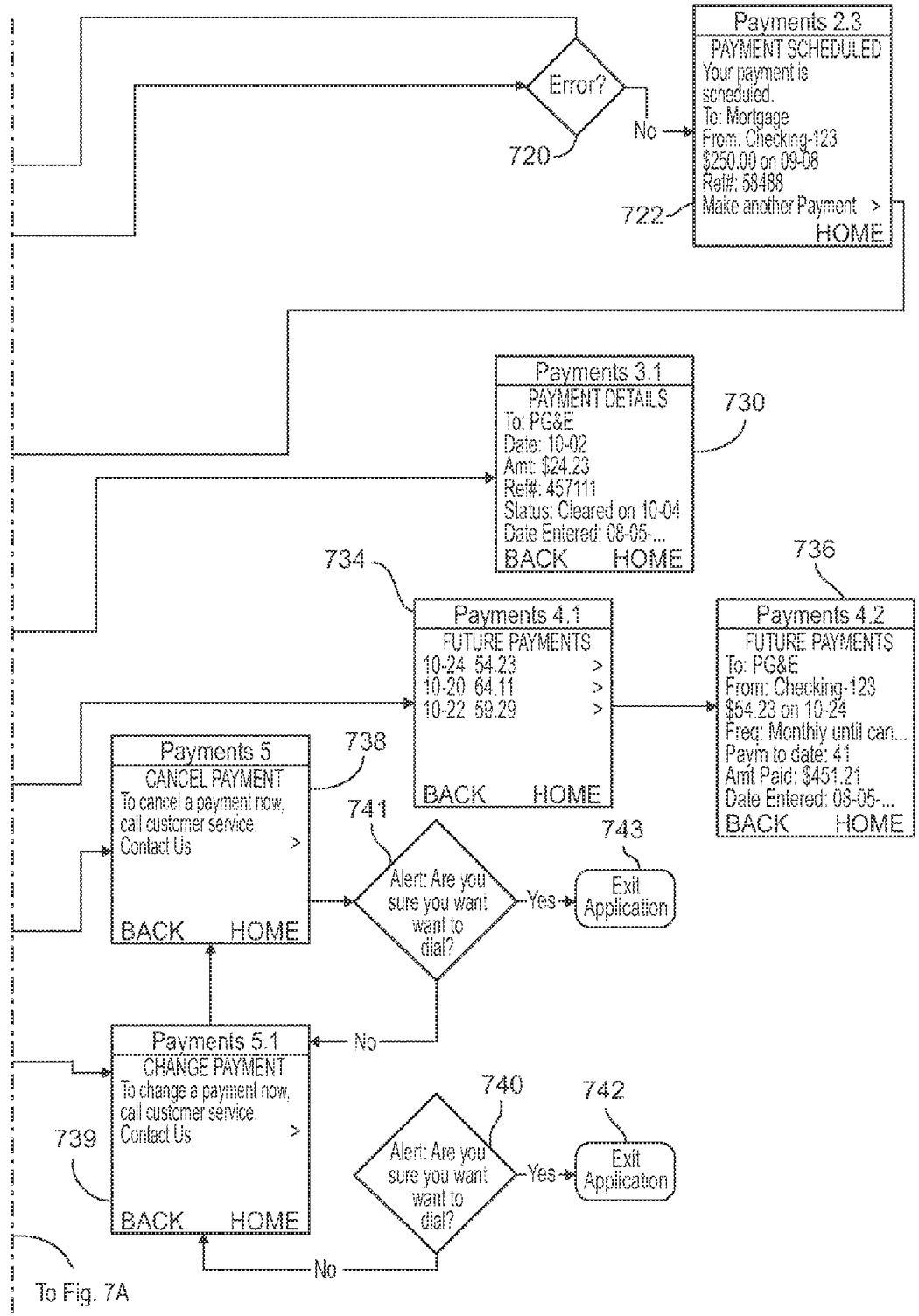

FIGS. 7 and 7B illustrate one embodiment of the present invention where, from the "Home" screen, the user selects the "Payment" option (514) (see FIG. 5). Since access concerning certain account information, such as payments is secured, before displaying payment information to the user's wireless device, the system may ensure that the account has been properly authenticated (702). If the account has not been authenticated, the user may be directed through the account authentication process beginning at step 704 illustrated in FIGS. 4A and 4B.

Once the authentication of the user has been confirmed, the user interface application screen (706) may present the user with options such as "Make Payments," "Recent Payments," "Future Payments," and "Add/Edit Payments." For example, if the user desires to make a payment, the user selects the "Make Payments" option through the wireless device, the ISA retrieves a list of payees (708) and presents user interface screen (710) requesting selection from a list of known payees. If the user selects a payee on the list, the ISA retrieves all information relating to the user's last transaction with the selected payee (712) and displays information such as the account from which the payment was made, the amount of the payment, and the next suggested payment date, e.g., default to the next day, (714) to the user's wireless device in appropriate fields. In some cases, the user is required to fill in certain information and/or has the ability to update the fields to accurately reflect the current desired transaction Once all fields are completed, the ISA presents the user with a confirmation screen (716), allowing the user to either confirm the payment as displayed and continue with the transaction or cancel the transaction and return to the user input screen (714). In this exemplary embodiment, if the user chooses to make the payment, the payment is submitted for approval via the ISA from the service provider (718). The service provider verifies that there are no errors in the proposed payment transaction (720). If the payment transaction is rejected for errors, the user is returned to the user input screen (714). If no errors are found in the transaction, the payment is scheduled and a confirmation screen may be displayed to the user (722) illustrating the details of the payment transaction including a reference number to track the transaction.

Returning to screen (706), the user may select the "Recent Payment" option. The ISA retrieves and displays (728) X recent payments made in connection with the selected user account, e.g., where X=32. The user may then choose to view the details of a specific transaction from the list provided or view the next X recent payments (730). Similarly, the user may choose to select the "Future Payments" option from the user interface screen (706). The ISA presents the user with an additional screen of options such as "View Payments," "Change Payments," and "Cancel Payments" (732). If the user chooses to view the payments, the user is presented with a screen displaying all scheduled future payments (734). Further, the user may choose to view additional details regarding a specific scheduled payment. The user may view details such as date, payee name, account charged, recurrence frequency, reference number, and amount paid (736).

If the user selects either the "Change Payments" option or the "Cancel Payments" option from user interface screen (732), where the user can select to change and/or cancel payment or contact customer service for assistance in completing the desired transaction (738), (739). If the user chooses to call customer service, the user may be presented with an alert to confirm the call (740), (741). If the user chooses to continue the call to customer service, the user interface application may be closed and the session may be terminated (742), (743). If the user chooses not to call customer service, the user may be returned to the user interface screen (738), (739). Finally, if the user chooses the "Add/Edit Payees" option from either the user interface menu screen (706), or the "Select Payee" screen (710), the system may direct the user to the "Add Payee" option as exemplified in FIG. 11 and described below.

Figure 8A:
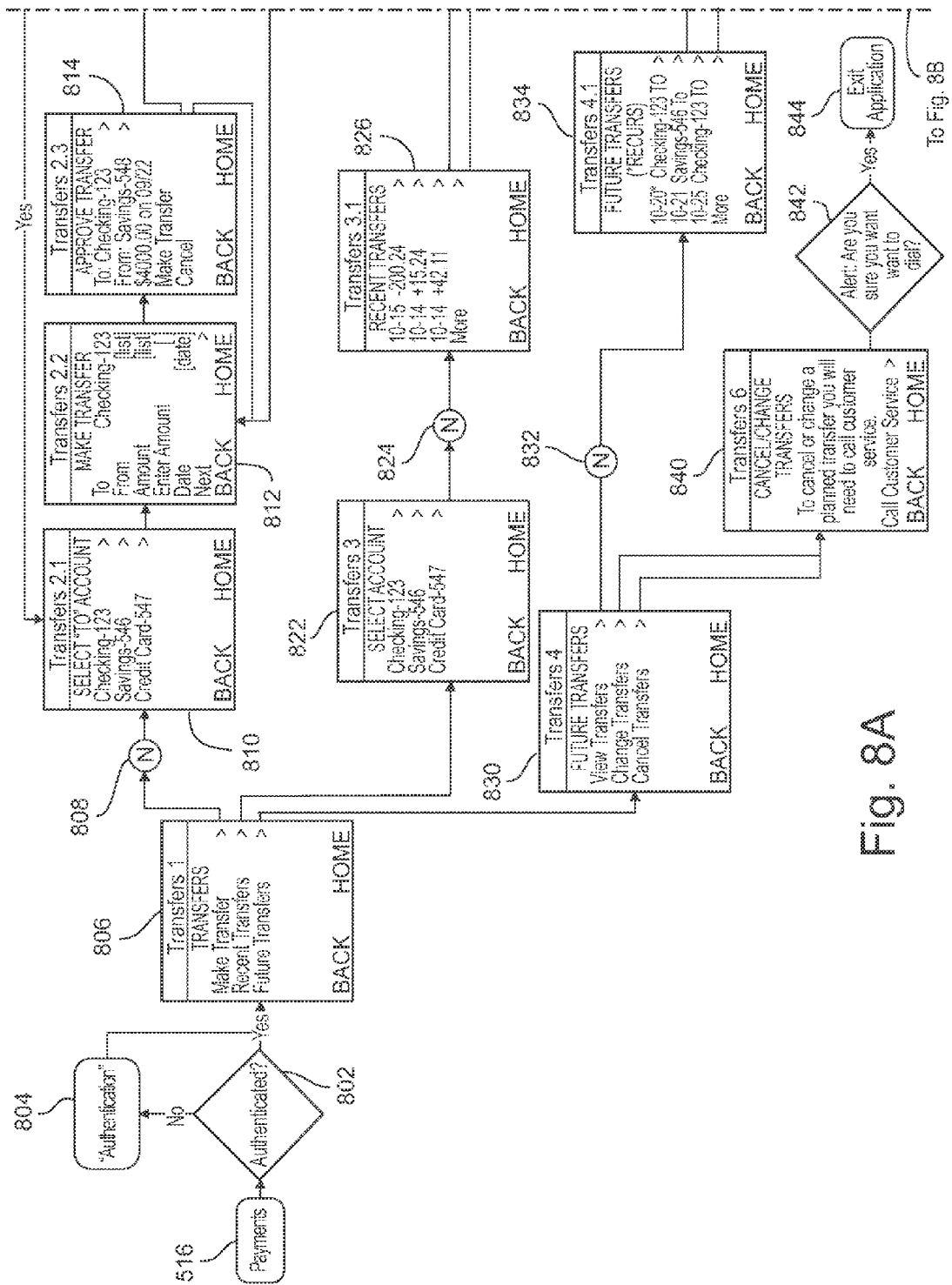
FIGS. 8A and 8B present an exemplary embodiment of the process of making "Transfers" and illustrates the visible display on the screens of a user's wireless device that facilitate completion of the transaction according to the exemplary embodiment.
Figure 8B:
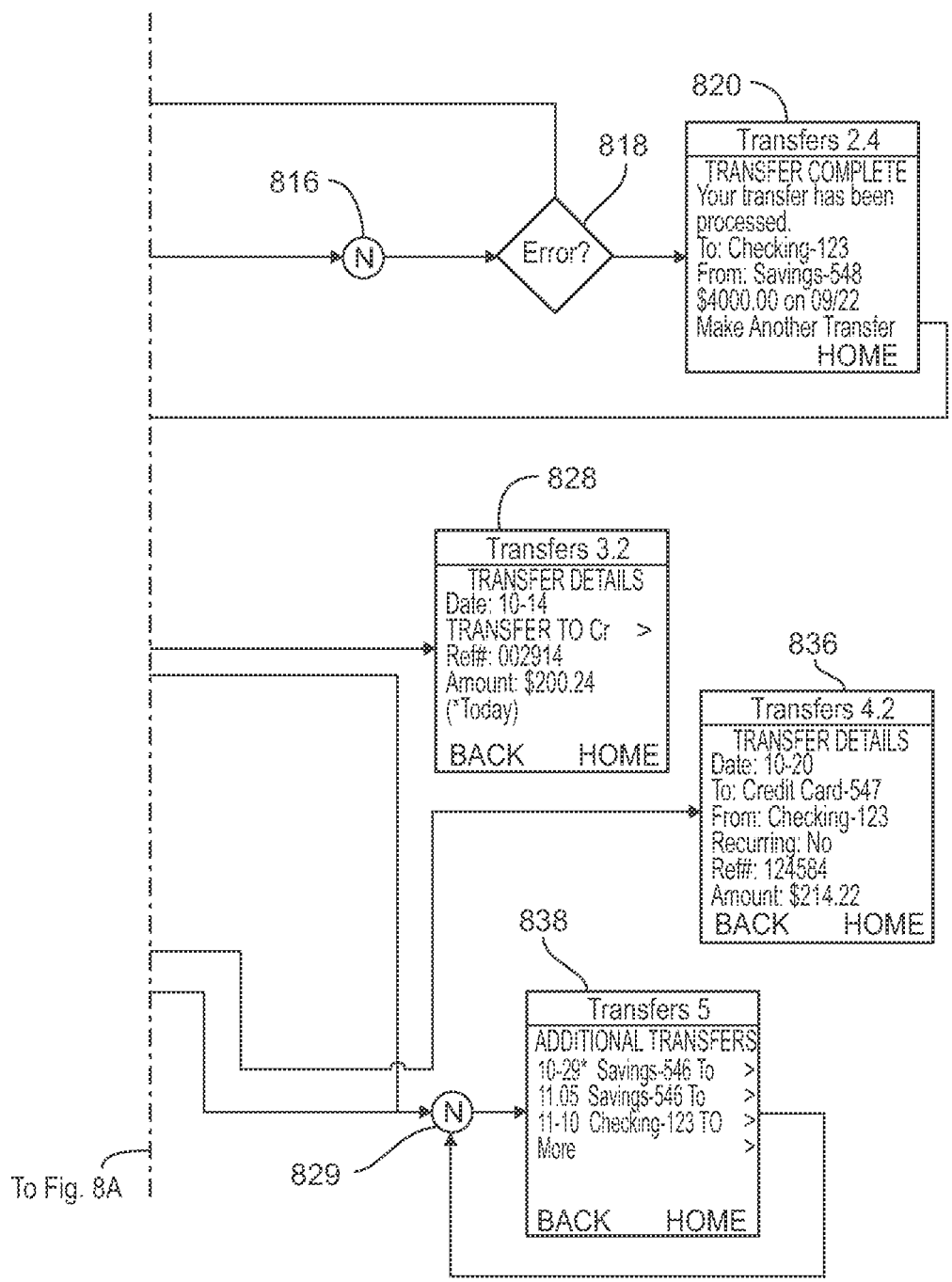

FIGS. 8A and 8B illustrate one embodiment of the present invention where the user selects the "Transfers" option (516) from the "Home" screen (see FIG. 5). Since the ability to make a transfer is a secured option, the system may ensure that the account has been properly authenticated (802). If the account has not been authenticated, the user may be directed through the account authentication process beginning at step (804) as illustrated in FIG. 4 FIGS. 4A and 4B.

Once the account has been properly authenticated, the ISA displays a menu of optional transfer transactions to the user's wireless device (806). For example, the options may include "Make Transfer," "Recent Transfers," and "Future Transfers." If the user chooses to make a transfer, the ISA pulls the available transfer accounts for the user (808) and the user is presented a user interface screen (810) listed available transfer accounts. Once an account is selected, the user is presented with an interface screen that allows the user to input details into fields such as the account to transfer funds from, the amount to be transferred, and the date of transfer (812). Once the user input fields have been filled, the user is directed to another display screen (814), where the user can approve the transfer information or cancel the transfer transaction (814). If the user chooses to cancel the transaction, the user may be returned to the user interface screen in which the user input transfer details (812). If the information for the transfer is correct, and the user chooses to continue with the transaction, the ISA pulls the information for the selected to/from accounts involved in the transfer (816) and check the user submitted information for any errors (818). If the ISA determines that an error exists, the user is returned to the user interface screen (810). If the system determines no errors are present, the ISA returns a user interface screen (820) to the user confirming the completion of the transfer as well as additional details such as the account that funds were transferred to, the account the funds were transferred from, the amount of the transfer, the date of the transfer, and a reference number corresponding to the completed transfer. From screen (820), the user may choose to "Make Another Transfer" and be returned to screen (812).

The user may choose the "Recent Transfers" option from the user interface screen (806). If "Recent Transfers" is selected, the user is directed to another screen (822) presenting a listing of user accounts and allowing the user to select the account to be viewed. Once the user has selected the account, the ISA pulls the first X, e.g., X=32, recent transfer transactions for that account (824) and returns a screen to the user illustrating a listing of the recent transfers on the selected account (826). The user may select any of the listed transfers to see additional details about the transaction (828). If the user does not find the desired transfer in the listing (826), the user may choose the option to view additional transfers at which point the ISA pulls the next X recent transfer transactions (829). The ISA generates and display a listing of additional transfers scheduled for the selected account (838). If the desired transfer is still not visible, the user may have the option view more transfers. If the "more" option is available and the user selects the option, the ISA may generate and display additional transfers on the account until all available transfers have been viewed by the user.

The user may also select "future transfers" from the listing of options (806). If the user selects future transfers, the user is presented with options such as "view transfers," "change transfers," and "cancel transfers." If the user chooses the view transfers option, the ISA generates (832) and displays a listing of pending transfers on the user's accounts (836). The user may view the details of any of the listed transfers. If the user chooses to view the details of an account, the ISA pulls (829) and returns transfer details such as date, to/from account information, recurrence frequency, reference number, and amount (836). If the desired transfer is not present in the listing (834), the user may choose to view additional transfers, at which point the ISA generates and displays additional transfers concerning the selected user account (838). The user may use the "more" option to prompt the ISA to continue generating and displaying transfers on the account until all transfers have been displayed.

If the user chooses either the "change transfers" option or the "cancel transfers" option from the user menu (830), the user is directed to contact customer service (840). If the user chooses to call Customer service, the user is presented with an alert to confirm the call (842). If the user chooses to continue the call to customer service, the user interface application may be closed (844).

Figure 9:
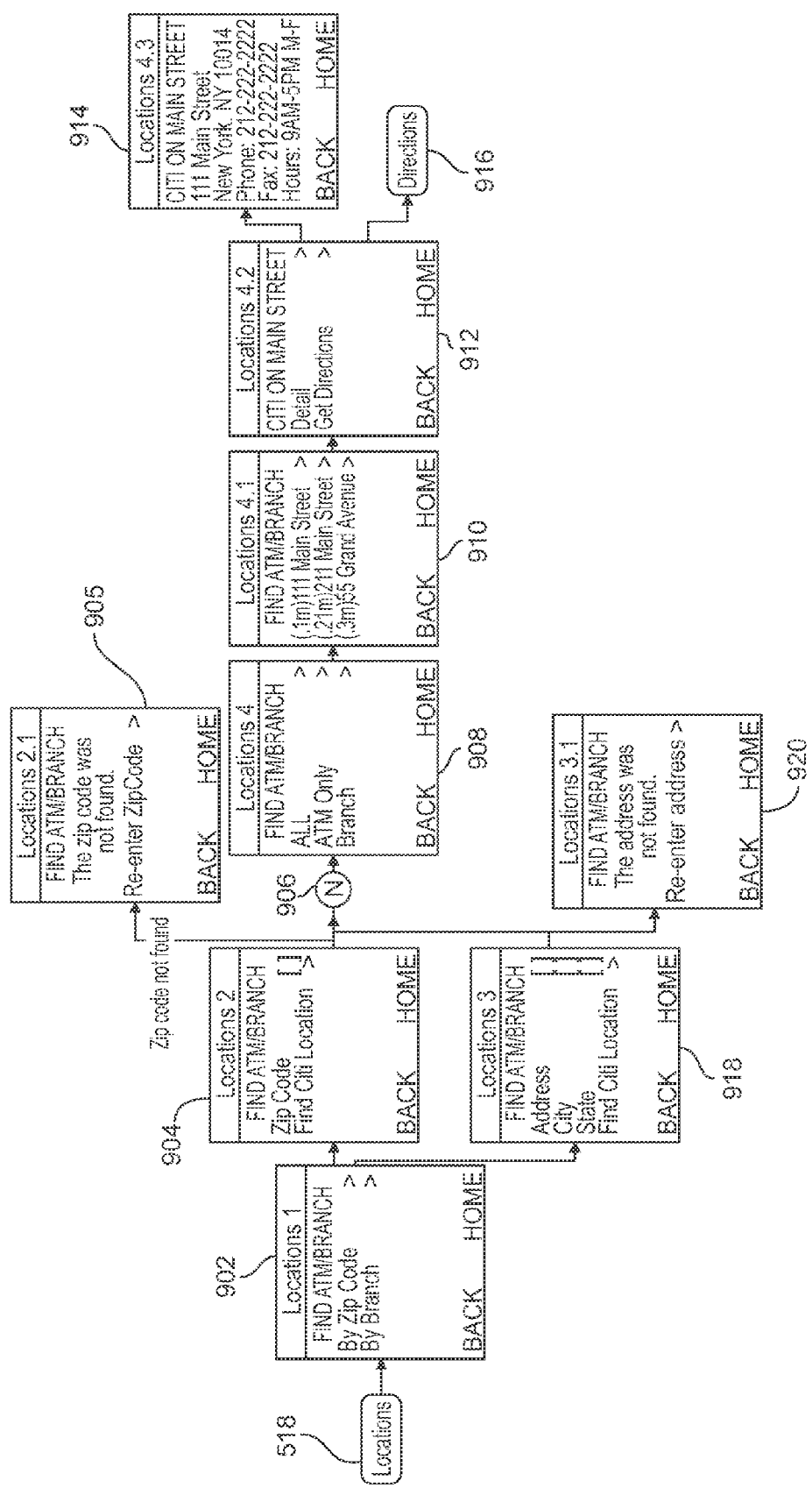
FIG. 9—presents an exemplary embodiment of the process of locating ATM or branch "Locations" and illustrates the visible display on the screens of a user's wireless device that facilitate completion of the transaction according to the exemplary embodiment.
Figure 12:
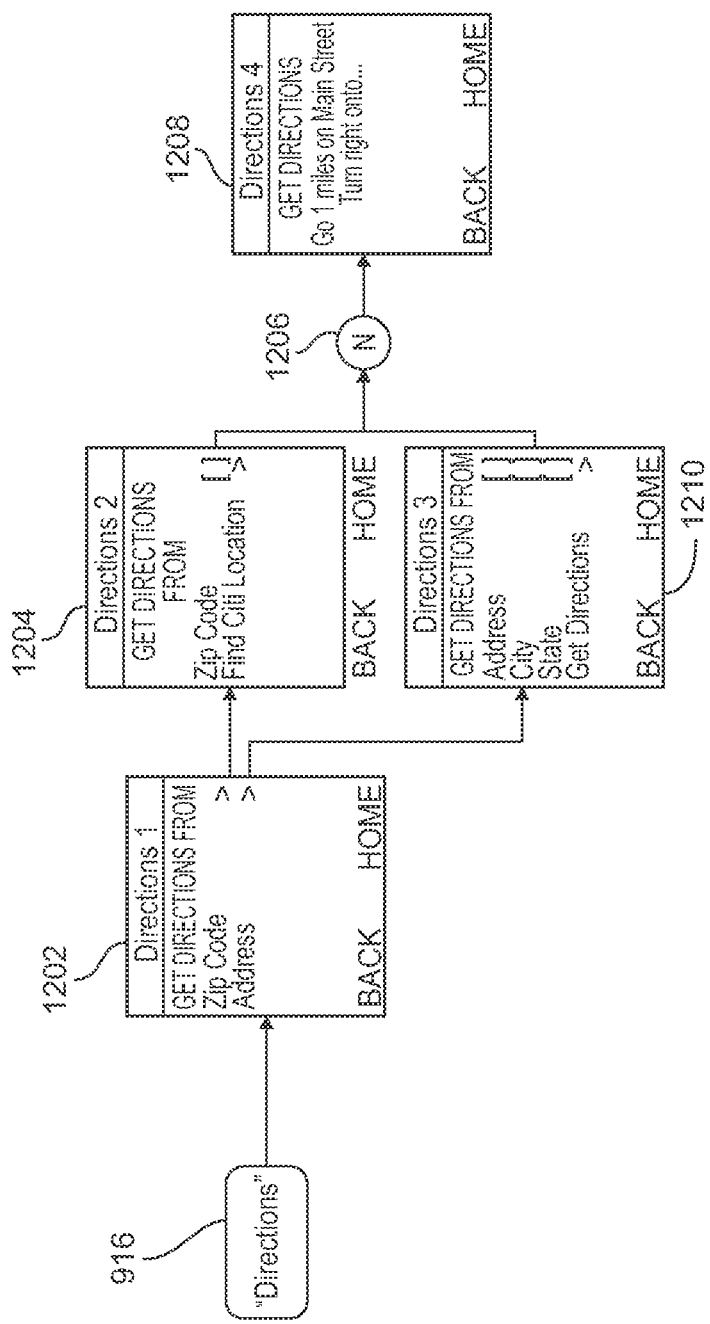
FIG. 12—presents an exemplary embodiment of the process of getting "Directions" and illustrates the visible display on the screens of a user's wireless device that facilitate completion of the transaction according to the exemplary embodiment.

FIG. 9 illustrates an embodiment of the present invention where selection of the "locations" option (518) from the "home" screen of FIG. 5, present the user with options for finding ATM and/or service provider branch locations. The user is presented with an application interface screen (902) prompting the user to identify the area in which they are interested in finding a branch or ATM location. The user may either choose to enter the zip code of the area in which he is searching using an interface screen (904) or an address, city, and state using an interface screen (918). If the entered zip code is not found, the user is presented with a screen conveying this information and requesting re-entrance of the zip code (905). Similarly, if the entered address is not found, the user is presented with a screen conveying this information and requesting re-entrance of the address (920). Once the search parameters are correctly supplied the ISA retrieves the requested information (906) and the user is provided with options to display all search results, ATM locations only, or Banking branches only (908). Once the user selects the relevant result to display, the results are displayed to the user, providing the user with the distance and the address of the desired transaction points (910). The user may also select a specific location and request to get more details about that location or to get directions (912). If the user chooses to get location details, the user is provided with relevant information such as the complete address, phone number, fax number, and hours of operation (914). If the user desires directions to the location, the user may be directed to the directions menu as illustrated in FIG. 12 (916).

Figure 10:
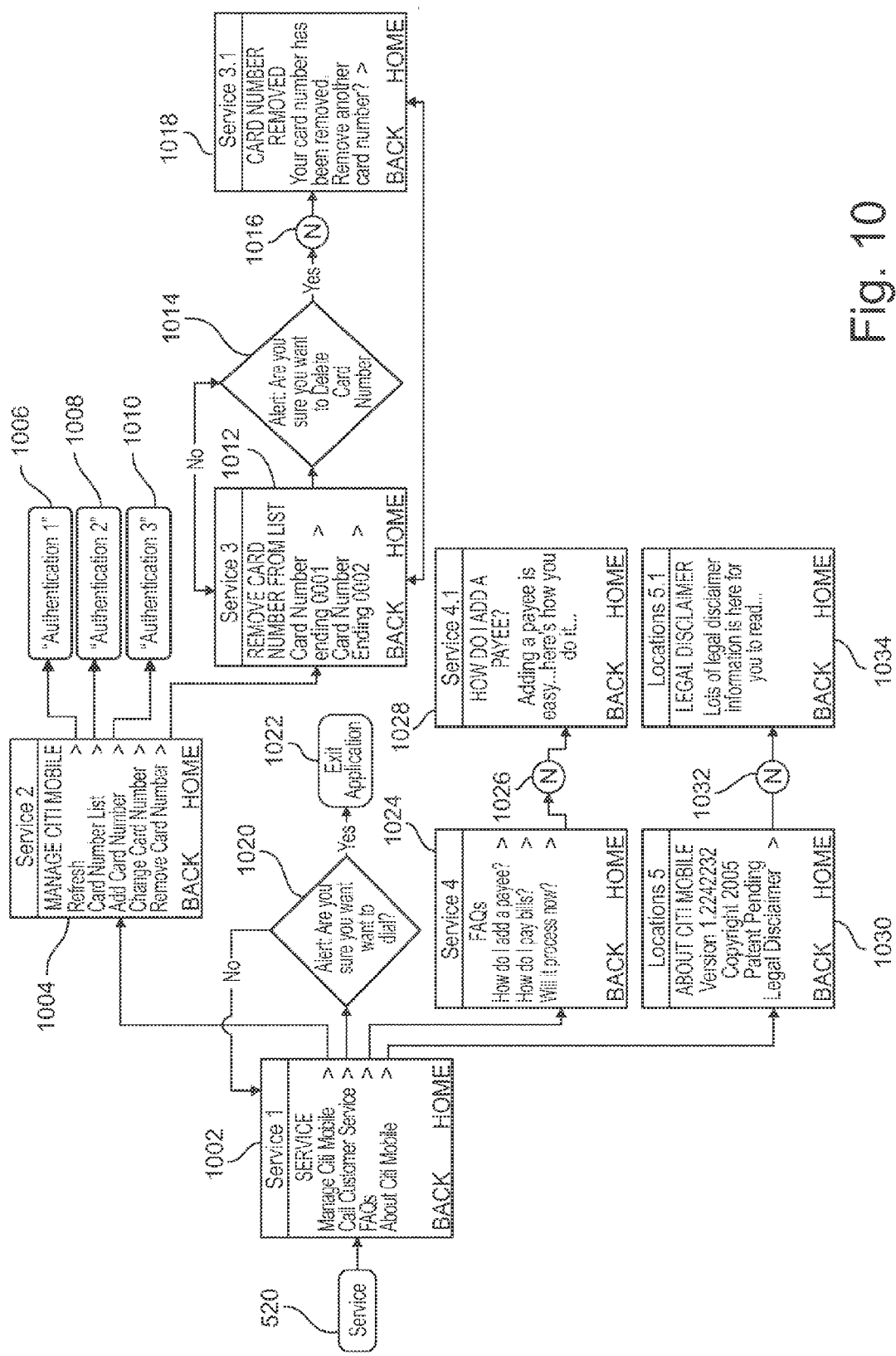
FIG. 10—presents an exemplary embodiment of the process of addressing "Service" related needs and illustrates the visible display on the screens of a user's wireless device that facilitate completion of the transaction according to the exemplary embodiment.

FIG. 10 illustrates one embodiment of the present invention where the user may select the "Service" option (520) from the "Home" screen of FIG. 5. The service option presents the user with a menu of available service-related options (1002) including for example, managing the ISA, contacting customer service, providing the user with answers to frequently asked questions ("FAQs"), as well as providing specific information about the user interface application.

If the user selects the option to manage the account via the user interface application, the user may be presented with options such as "Refresh Card Number List," "Add Card Number," "Add Card Number," and "Remove Card Number." These options may be presented to the user via a user interface screen (1004). If the user elects either to refresh Card Number list (1006), to Add Card Number (1008), or to change Card Number (1010), it will be necessary for the user to be authenticated to the service provider by going through an authentication process, such as that illustrated in FIGS. 4A and 4B. If the user elects to remove a Card Number, the user is directed to a user interface screen (1012) providing the user with a listing of the current Card Numbers registered to the user account. For example, once the user selects the Card Number to be removed from the list, the user is prompted with an alert to ensure the user desires to delete the selected Card Number (1014). If the user decides not to delete the selected CIN, the user may be returned to the user interface screen (1012). If the user chooses to confirm the removal of the Card Number (1014), the ISA removes the selected Card Number (1016) and is provided with a user interface screen (1018) confirming the removal. The user is also presented with an option to remove an additional Card Number (1018). If the user desires to remove another Card Number, the user may be directed to an updated listing of Card Numbers currently linked to the user's account (1012).

If the user chooses the "Call Customer Service" option from the main "Services" menu (1002), the user is presented with an alert to confirm the call (1020). If the user chooses to continue the call to customer service, the user interface application is closed (1022).

If the user chooses to view "FAQs," the user is directed to a listing of questions concerning the use of the ISA (1024). Once a question has been selected, the ISA retrieves the answer (1026) and is presented with an answer (1028).

Further, the user may be provided with information about the ISA. If the user selects the "About" option from the "Services" main page (1002), the user is directed to a user interface screen (1030) providing the user with a listing of details such as the application version number, the copyright year, patent information, as well as any other important information pertaining to the ISA (1030). Additionally, the user may select to view a "Legal Disclaimer" from the "About" user interface screen (1030). If the user elects to view the legal disclaimer, the disclaimer information is retrieved (1032) and display to the user (1034).

Figure 11:
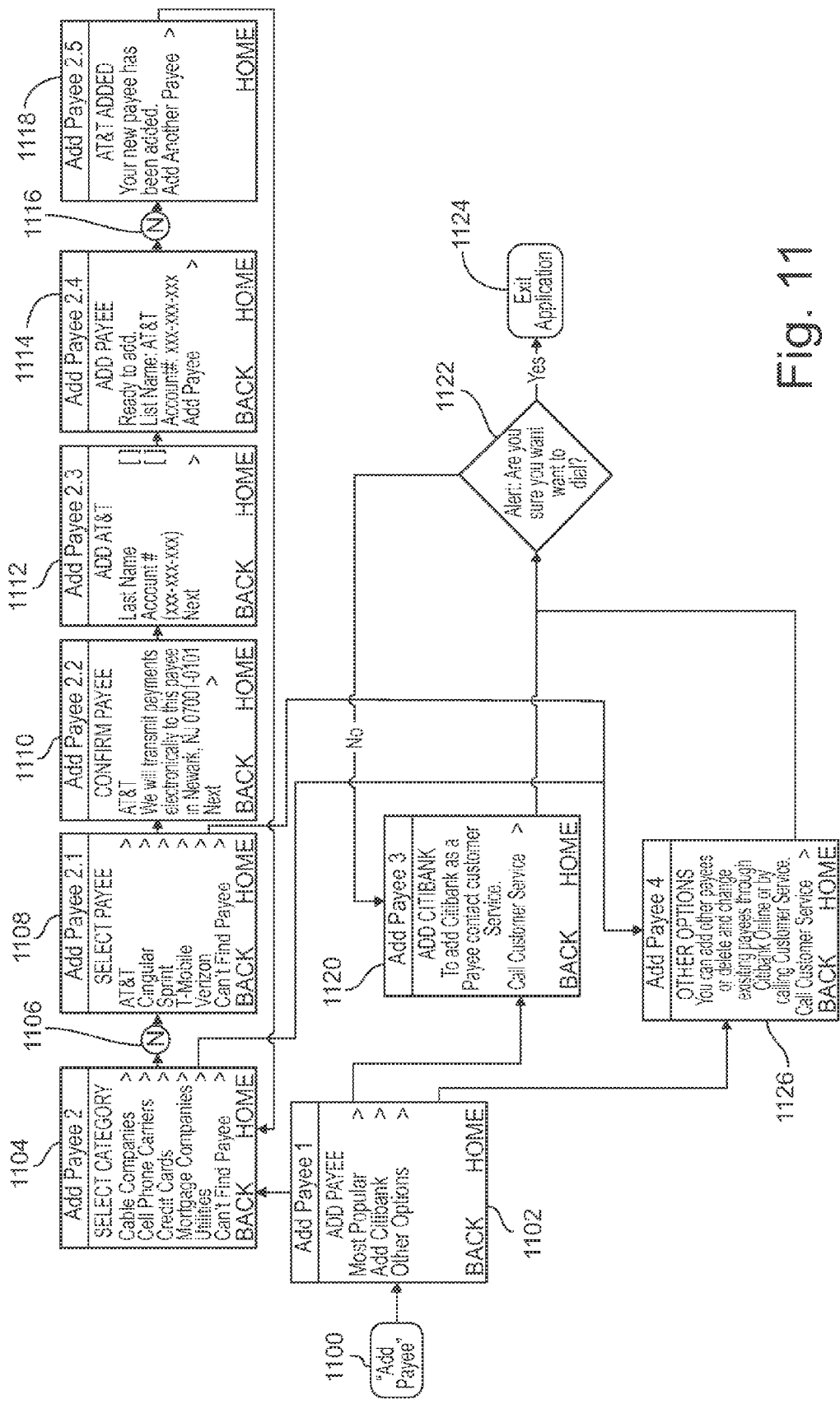
FIG. 11—presents an exemplary embodiment of the process to "Add Payee" and illustrates the visible display on the screens of a user's wireless device that facilitate completion of the transaction according to the exemplary embodiment.

FIG. 11 illustrates one embodiment of the present invention where the user may select the "Add Payee" option (1100) available through the "Payments" user menu illustrated in FIGS. 7A and 7B, screen (706). If the user selects to add a payee, the user is presented with a user interface screen (1102) that provides the user with a listing of payees that may be added to the account. In a preferred embodiment, the service provider tracks the most popular payees and allows the user to select a payee based on service category (1104). Alternatively, if the desired category or payee is not listed among the options on screen (1104), the user may add, delete, or modify the payee by accessing customer service (1126). The user may choose to call customer service directly from the wireless device (1126). If the user chooses to call customer service, the user may be presented with an alert to confirm the call (1122). If the user chooses to continue the call to customer service, the user interface application may be closed (1124).

If the desired payee category is present in the list of most popular payees, the user may select the desired category from the list (1104). Once the user selects the category, the ISA pulls the payees in the selected category (1106) and presents a list of the most popular payees in the selected category to the user (1108). If the desired payee is not returned in the listing, the user has the option to add, delete, or modify the payee by accessing customer service (1126). The user may choose to call customer service directly from the wireless device (1126). If the user chooses to call Customer service, the user may be presented with an alert to confirm the call (1122). If the user chooses to continue the call to customer service, the user interface application may be closed (1124).

From the list of payees on screen (1108), the user may select a single payee and view details about the selected payee (1110). If the user confirms that the proper payee is displayed (1110), the user has the option to add account details such as an account name and an account number (1112). Once the user inputs the relevant account information, a confirmation screen (1114) is available to the user to confirm the payee information to be linked to the user account. Once the information user verifies that the information is correct, the ISA adds the selected payee to the user's account information (1116) and the user may be presented with a user interface screen (1118) confirming the addition of the payee.

Additionally, the user may choose to add additional payees to be linked to the selected user account (1118). If the user chooses to add an additional payee to the account, the user is again directed to the user interface screen (1104).

The user may choose to add the service provider, e.g., Citibank, as a payee (1102). If the user desires to add the service provider as a payee, the user is directed to contact customer service (1120). If the user chooses to call customer service, the user is presented with an alert to confirm the call (1122). If the user chooses to continue the call to customer service, the user interface application is closed (1124).

Finally, the user may choose to consider other available options from the "Add Payee" menu (1102). For example, by selecting "Other Options," the user is provided with a user interface screen (1126) advising the user of the options to add, delete, or modify the payee by accessing customer service. In one embodiment, the user may choose to call customer service directly from the wireless device (1126). If the user chooses to call customer service, the user is presented with an alert to confirm the call (1122). If the user chooses to continue the call to customer service, the user interface application is closed (1124). In a further embodiment, an unlisted payee may be added without the need to contact customer service. In this embodiment, the user may enter information about a payee, e.g., name, address, etc., directly into designated fields.

FIG. 12 illustrates an embodiment of the present invention where the user may select the option of getting directions to an ATM or branch location. For example, if the user selects the "Directions" option (916) from the "Locations" menu presented in FIG. 9, the user is provided with a user interface screen (1202) that allows the user the option of either entering the zip code or the address of the desired location. Regardless of whether the user chooses to input the zip code (1204) or the address (1210), the request is processed (1206), and directions from the user input starting point to an ATM or branch location may be displayed to the user's wireless device (1208) using applications that may be used to display maps or other directional tools to a wireless device, e.g. MapPoint/Microsoft.

While various preferred embodiments of the present invention have been described, it should be recognized that these embodiments are merely examples that illustrate the principles of the invention. Modifications and adaptations of the disclosed embodiments may be readily apparent to those skilled in the art without departing from the spirit of the invention. Therefore, the embodiments described herein are not limiting.

The invention claimed is:

1. A method for facilitating wireless transactions with a service provider using a wireless device comprising:
   accepting registration information from a microprocessor of a user's wireless device by a server of a service provider, wherein the service provider maintains a data server storing financial account data for the user;
   verifying the registration information from the user by the service provider's server;
   activating access to software on the user's wireless device microprocessor in response to verification of the registration information by the service provider's server, wherein the software includes
   (i) an interface application for navigating the user through a transaction using the wireless device microprocessor and
   (ii) a protocol application for facilitating the transfer of data between the wireless device microprocessor and the server of the service provider and also between the wireless device microprocessor and a plurality of different host system servers;
   wherein activating access to the software further comprises downloading the software to the user's wireless device microprocessor in a two-part download sequence in response to verifying the registration information by the service provider's server, and wherein said two-part download sequence further comprises downloading the interface application in a first part of said two-part download sequence and thereafter downloading the protocol application in a second part of said two-part download sequence only after detecting, by the service provider's server, the downloaded interface application running for a first time on the user's wireless device microprocessor; and
   authenticating the user by the server of the service provider in response to user identification data supplied by the wireless device microprocessor using the interface application.

2. The method according to claim 1 wherein registration information is accepted via one of the following Internet, phone, or in-person.

3. The method according to claim 1, wherein the registration information includes the phone number associated with user wireless device.

4. The method according to claim 1, wherein the registration information includes at least one user account recognized by the service provider.

5. The method according to claim 1, further comprising establishing user identification data after verification of the registration information.

6. The method according to claim 1, wherein downloading the software to a user's wireless device further comprises forwarding a confirmation message to the user's wireless device with instructions for confirmation embedded in the message.

7. The method according to claim 6, wherein the message is an SMS message including a URL for accessing the instructions for confirmation.

8. The method according to claim 6, wherein the confirmation message must be accessed by the user within a predetermined period of time.

9. The method according to claim 5, wherein the user identification data includes a user identifier and an associated access code.

10. The method according to claim 1, wherein the software on the user's wireless device is accessible through a software icon viewable on a display of the user's wireless device.

11. The method according to claim 10, further comprising providing the user with a first in an available series of interface screens on the display of the user's wireless device after the user selects the software icon.

12. The method according to claim 11, further comprising accepting user information requests at the service provider via the wireless device initiated from the first interface screen.

13. The method according to claim 12, wherein the user information requests are provided to the service provider as formatted by the protocol application.

14. The method according to claim 13, wherein the protocol application utilizes at least the OFX format.

* * * * *

UNITED STATES PATENT AND TRADEMARK OFFICE
CERTIFICATE OF CORRECTION

PATENT NO.         : 9,749,855 B1
APPLICATION NO.    : 14/226374
DATED              : August 29, 2017
INVENTOR(S)        : Peter Tompkins, Jennifer Vos and Arun Ahuja It is certified that error appears in the above-identified patent and that said Letters Patent is hereby corrected as shown below:

On the Title Page

Item (54), and in the Specification Column 1, change the title from "Method and System for Conducting Financial Transaction and Non-Financial Transactions Using a Wireless Device" to
- Method and System for Conducting Financial and Non-Financial Transactions Using a Wireless Device -.

Signed and Sealed this
Nineteenth Day of June, 2018

Andrei Iancu
*Director of the United States Patent and Trademark Office*